United States Patent [19]
Nelson et al.

[11] Patent Number: 6,018,449
[45] Date of Patent: Jan. 25, 2000

[54] METHOD FOR AUTOMATED RECONFIGURATION OF A DISTRIBUTION SYSTEM USING DISTRIBUTED CONTROL LOGIC AND COMMUNICATIONS

[75] Inventors: William Christian Tracy Nelson, Duvall, Wash.; Daniel Partridge, El Cerrito, Calif.; Donald S. Berkowitz, Redmond, Wash.; Witold Bik, El Cerrito, Calif.; Ed Brasher, Pinole, Calif.; Barry Tangney, San Leandro, Calif.

[73] Assignee: Energyline Systems, L.P., Berkeley, Calif.

[21] Appl. No.: 08/978,966

[22] Filed: Nov. 26, 1997

Related U.S. Application Data

[60] Provisional application No. 60/032,576, Dec. 4, 1996.

[51] Int. Cl.⁷ ........................................................... H02H 3/00
[52] U.S. Cl. ................................................. 361/66; 361/64
[58] Field of Search .................................. 361/64, 66, 59, 361/61, 68–69, 72–75; 307/125–127, 129, 131

[56] References Cited

U.S. PATENT DOCUMENTS

| | | | |
|---|---|---|---|
| 3,152,286 | 10/1964 | Field et al. ................................. | 317/22 |
| 3,331,921 | 7/1967 | Neiswinter et al. ....................... | 178/69 |
| 3,702,460 | 11/1972 | Blose ....................................... | 340/150 |
| 3,970,898 | 7/1976 | Baumann et al. ......................... | 361/68 |
| 4,057,785 | 11/1977 | Furniss et al. ............................ | 340/163 |
| 4,075,699 | 2/1978 | Schneider et al. ....................... | 364/492 |
| 4,315,251 | 2/1982 | Robinson et al. .................. | 340/310 A |
| 4,359,644 | 11/1982 | Foord ....................................... | 307/40 |
| 4,396,915 | 8/1983 | Farnsworth et al. ............... | 340/870.03 |
| 4,535,409 | 8/1985 | Jindrick et al. .......................... | 364/481 |
| 4,587,588 | 5/1986 | Goldstein ................................. | 361/54 |
| 4,672,555 | 6/1987 | Hart et al. ................................. | 364/483 |
| 4,745,512 | 5/1988 | Hampson ................................. | 361/36 |
| 4,777,381 | 10/1988 | Fernandes ................................. | 307/64 |

(List continued on next page.)

OTHER PUBLICATIONS

Caird, K. et al., "An Advanced Distribution Automation RTU", Westronic, Inc., Canada, 1990, pp. 1–8.

"Model 2801–SC Automatic Switch Control User's Manual", EnergyLine Systems, Inc., Berkeley, CA, DOC024–000691–0F, Nov. 2, 1995.

Casains, R., "Automatic Operation of Distribution Network In Areas of Medium Load Density", International Conference on Electricity Distribution, London, IEE Contr. Pub. #99 (1973), pp. 191–196.

Joslyn "Sectionalizers" advertisement, Joslyn Hi–Voltage Corporation, D.B. 750–202, Jun. 1996, pp. 1–8.

Cooper "Sectionalizers" advertisement for Electronically Controlled, Manually Closed, Types GV and GW, Cooper Power Systems, Electrical Apparatus 270–20, Oct. 1991, copyright 1990 Cooper Industries, Inc., pp. 1–15.

Cooper "Sectionalizers" advertisement for Hydraulically Controlled Types GH, GN3, GN3V, Cooper Power Systems, Electrical Apparatus 270–10, Jan. 1990, copyright 1990 Cooper Industries, Inc., pp. 1–13.

"Model 2800S Switch Control, Model 2801S Automatic Sectionalizer Control" Operation Guide (Preliminary), EnergyLine Systems, Inc., Doc. 2800S/2801S–003, Sep. 3, 1992, pp.1–30.

L. Fendrick, "Intelligent Substation Improves Performance," Transmission & Distribution World, Oct. 1998.

*Primary Examiner*—Jeffrey Gaffin
*Assistant Examiner*—Michael J. Sherry
*Attorney, Agent, or Firm*—Wilson Sonsini Goodrich & Rosati

[57] ABSTRACT

A system and method which detects and responds to abnormalities in a distribution system by reconfiguring nodes of the system to minimize the effects of the abnormality without the requirement of communicating with a central controller. The nodes in the system coordinate a response to a system abnormality through a process of self-organization in which each node acts based on its own programming, sensors, and stored data. Each node keeps other nodes apprised of its actions so that they may in turn decide what actions are appropriate for them to take.

148 Claims, 8 Drawing Sheets

Distribution System 100

U.S. PATENT DOCUMENTS

| | | | |
|---|---|---|---|
| 4,803,635 | 2/1989 | Andow | 364/483 |
| 4,835,651 | 5/1989 | Li et al. | 361/68 |
| 4,847,780 | 7/1989 | Gilker et al. | 364/483 |
| 4,868,410 | 9/1989 | Nakamura | 307/20 |
| 4,916,628 | 4/1990 | Kugler | 364/492 |
| 4,972,290 | 11/1990 | Sun et al. | 361/64 |
| 4,984,124 | 1/1991 | Yeh | 361/59 |
| 5,006,846 | 4/1991 | Granville et al. | 340/870.28 |
| 5,179,376 | 1/1993 | Pomatto | 340/870.02 |
| 5,237,511 | 8/1993 | Caird et al. | 364/483 |
| 5,303,112 | 4/1994 | Zulaski et al. | 361/67 |
| 5,305,174 | 4/1994 | Morita et al. | 361/63 |
| 5,341,268 | 8/1994 | Ishiguro et al. | 361/62 |
| 5,513,061 | 4/1996 | Gelbien et al. | 361/63 |
| 5,517,423 | 5/1996 | Pomatto | 364/492 |
| 5,701,226 | 12/1997 | Gelbien et al. | 361/63 |
| 5,760,492 | 6/1998 | Kanoi et al. | 307/18 |
| 5,784,237 | 7/1998 | Velez | 361/62 |

METHOD FOR AUTOMATED RECONFIGURATION OF A DISTRIBUTION SYSTEM USING DISTRIBUTED CONTROL LOGIC AND COMMUNICATIONS

CROSS-REFERENCE TO RELATED PROVISIONAL APPLICATION

This application claims the benefit of U.S. Provisional Application, Ser. No. 60/032,576, filed on Dec. 4, 1996, which is hereby incorporated by reference.

BACKGROUND OF THE INVENTION

1. Field of the Invention

The present invention generally relates to improvements in control of a distribution system, and more specifically to the use of intelligent autonomous nodes to monitor and control the distribution of material or energy.

2. Description of Related Art

In general, a distribution system comprises one or more sources connected through a distribution network to one or more delivery points. As the commodity (material or energy) is transported through the network, abnormalities (e.g., faults) may develop that can lead to a disruption of the normal flow of the commodity or a loss of the commodity from the system. In order to help minimize the effects of these abnormalities, a distribution system will typically have nodes at various locations throughout the network which operate to monitor or control the flow of the commodity through the system.

It is desirable to not only minimize the loss of the commodity when an abnormality occurs, but also to minimize the number of users who experience an interruption of the delivery of the commodity due to any abnormality. In order to reduce the loss of the commodity, the nodes in a system may have the capability to respond individually to system abnormalities without coordinating with other nodes. In such a system, nodes can prevent the commodity from flowing through the part of the distribution system where the abnormality exists. However, this system may interrupt service to more users than is absolutely necessary.

Each node may also communicate with a central control location which gathers information from each node and coordinates a system-wide response. In such centrally controlled systems, the central controller typically maintains a detailed map of the system topology, and this map must be updated whenever the system is reconfigured or new nodes are added. This can make such centrally controlled systems difficult and costly to implement and maintain. Additionally, for small systems with few nodes, the need to include a central controller can significantly add to the cost of the system.

Furthermore, once an abnormality is rectified, the nodes typically must be transitioned to a normal state or to a specified state. Once the abnormality is corrected, it is generally desired to place the nodes in the original configuration or a specified configuration, at present this is typically done manually.

What is needed is a distribution system in which nodes can be easily added, subtracted, or reconfigured and which can control the nodes of a distribution system in order to configure them to minimize the loss of the commodity and maximize the number of users served in the presence of an abnormality. Additionally, what is needed is a control system that can restore nodes into their normal operating state or any other specified state after the abnormality has been rectified.

Also what is needed is a distribution system in which the nodes can act independently and without a central controller. Preferably the nodes would locally store information about the system required to enable a node to react to system abnormalities and the information would be coded to ensure its reliability.

Furthermore, what is needed is a distribution system in which nodes that malfunction can remove themselves from coordinated system activities. Preferably when the malfunction in a node is rectified the node should be able to resume normal operation as part of the system.

Additionally, what is needed is a system that requires only one Messaging step in order to begin restoring service to users.

SUMMARY OF THE INVENTION

In one aspect of the invention, the system in accordance with the present invention detects and responds to abnormalities in a distribution system by reconfiguring the nodes of the system to minimize the effects of the abnormality without the requirement of communicating with a central controller. In the present invention, the nodes in the system coordinate a response to a system abnormality through a process of self-organization in which each node acts based on its own programming, sensors, and stored data. Each node keeps other nodes apprised of its actions so that they may in turn decide what actions are appropriate for them to take.

In another aspect of the invention, each node maintains a database of information on each of the other nodes. This database contains state information about other nodes in the system. This allows each node to ascertain, based solely on the information in the database, what actions are appropriate for it to take. The information contained in the record for each node in the database can be tailored depending on the type of distribution system to be controlled, the priorities of the system operators, and any other parameters deemed to be appropriate. In a preferred embodiment of the invention the distribution system that can be controlled is a single loop distribution system with two sources as shown in FIG. 1. It would not deviate from the present invention to have either more simple or more complex node topologies represented in the database.

In yet another aspect of the present invention, the data exchanged between nodes is coded to ensure reliability and accuracy of the data exchanged between nodes. In a preferred embodiment of the present invention, the exchanged data is time and sequence encoded to allow each node to ascertain, on its own, the reliability of the data.

Another feature of the present invention is that if nodes are physically moved to different points in the distribution system, the present invention only requires that the database of node records be reordered to reflect the current physical ordering of the nodes in the system.

Yet another aspect of the present invention is that it is easily scalable. A system can be initially configured with any number of nodes. At a later time nodes can be physically added or subtracted from the system. Removed nodes are simply deleted from the database while added nodes are added into the database. The process used by each node to determine its actions need not be altered when nodes are added or subtracted from a system.

Another aspect of the present invention is that it will also put the nodes in any desired state once the abnormality in the distribution system has been cleared. In one particular incarnation of the present invention, the controller can be configured to return the nodes of the distribution system to the state they were in prior to the occurrence of the abnormality.

Still another aspect of the present invention is that a set of nodes in one distribution system (a "team" of nodes) can be linked with a team of nodes from another distribution system in order to coordinate the response of the two teams of nodes.

Yet another feature of the present invention is that a team of nodes can be configured to operate even if one or more nodes in the team malfunctions. Malfunctioning nodes can be configured to remove themselves from coordinated system activities and to resume coordinated activities once the malfunction has been corrected.

Still another feature of the present invention is that the nodes can be configured such that only one message must be sent in order to restore service to users after an abnormality. In a centrally controlled system, often a node affected by the abnormality must signal the central controller that an abnormality has occurred. The central controller receives this message and then must decide what the appropriate response is. The central controller then signals the appropriate node to begin restoring service to users. In one incarnation of the present invention, nodes can be configured such that a node affected by the abnormality directly signals the appropriate node that an abnormality has occurred, and the signaled node can then immediately begin restoring service to users.

These and other purposes and advantages of the present invention will become more apparent to those skilled in the art from the following detailed description in conjunction with the appended drawings.

DETAILED DESCRIPTION OF THE PREFERRED EMBODIMENT

The present invention comprises a novel method and system for controlling a distribution system. The following description is presented to enable any person skilled in the art to make and use the invention, and is provided in the context of particular applications and their requirements. Various modifications to the preferred embodiment will be readily apparent to those skilled in the art, and the generic principles defined herein may be applied to other embodiments and applications without departing from the spirit and scope of the invention. Thus, the present invention is not intended to be limited to the embodiment shown, but is to be accorded the widest possible scope consistent with the principles and features disclosed herein.

Figure 1:
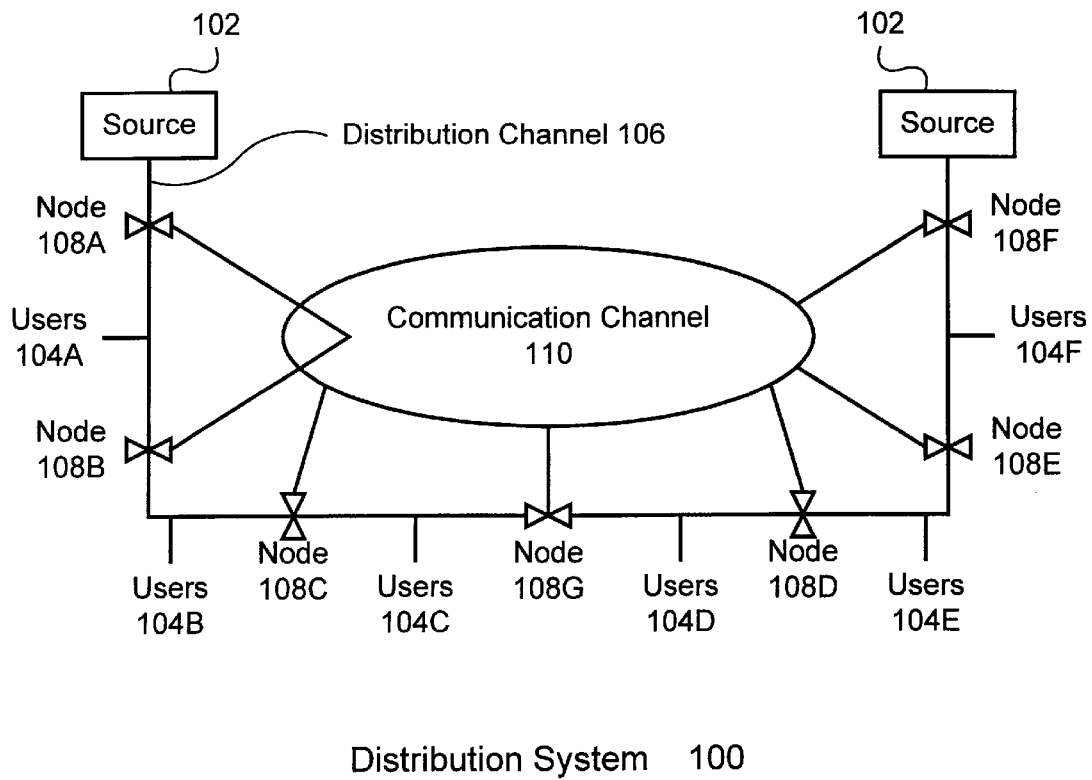
FIG. 1 shows a conventional distribution system in which nodes in accordance with a presently preferred embodiment of the invention have been installed.

FIG. 1 shows a simplified view of a portion of an exemplary electrical power distribution system that can be controlled by a preferred embodiment of the present invention. Distribution system 100 comprises a plurality of sources of electrical power 102 connected to a plurality of users 104 (e.g., factories, homes, etc.) through an electrical distribution channel 106 such as conventional electrical power lines. Distribution channel 106 has a plurality of nodes 108 placed at predetermined points along the channel 106. The depiction of the number of sources, users, channels and nodes in FIG. 1 is arbitrary and there may be a different configuration or number of each of these components in any given distribution system.

Figure 2:
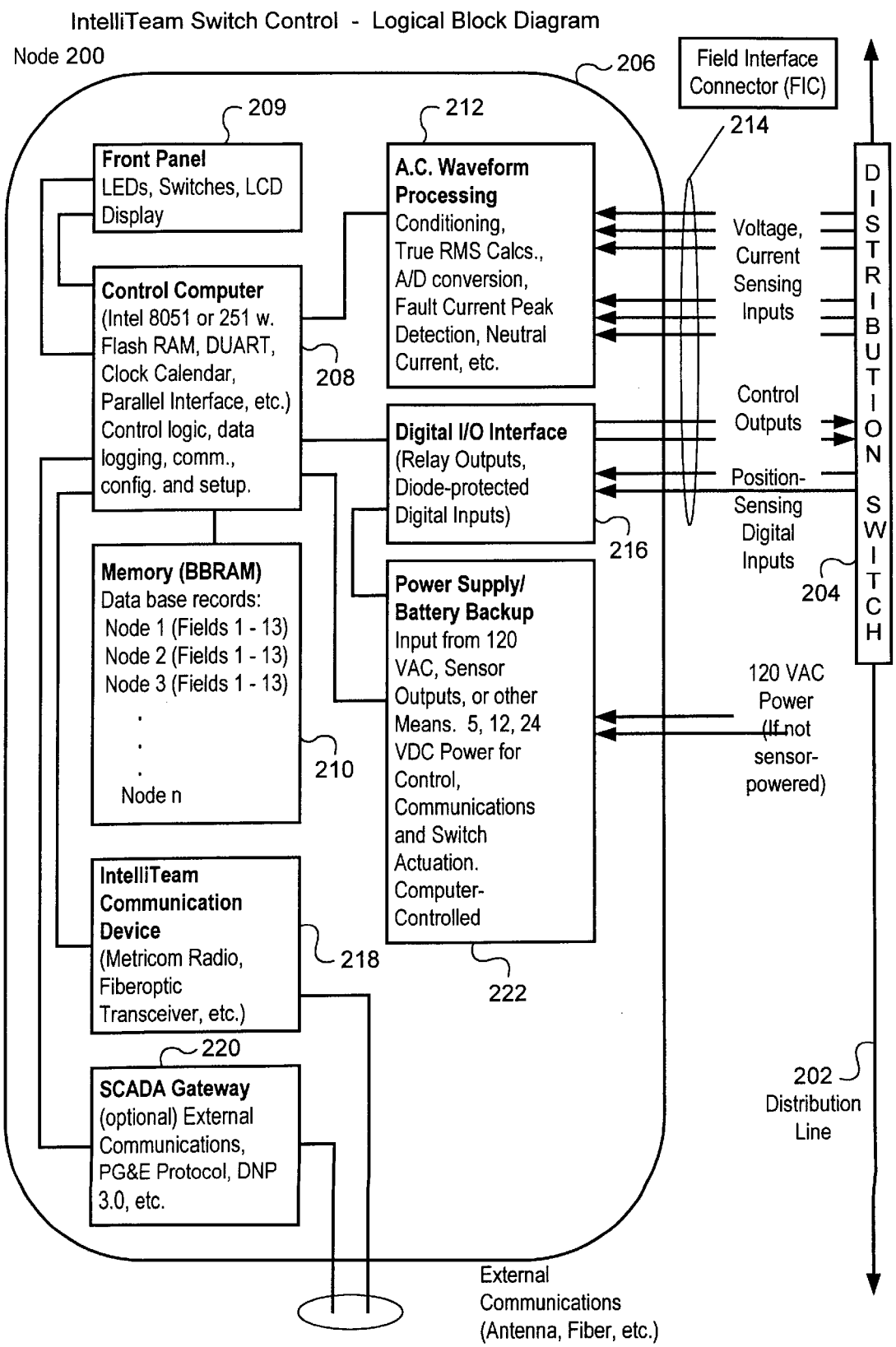
FIG. 2 is a block diagram of a node of a preferred embodiment of the present invention.

FIG. 2 depicts a presently preferred embodiment of a node 200 in accordance with the invention. Distribution channel 202 passes through switch 204 which can open and close the distribution channel at this point. In another embodiment of the invention, the switch could be replaced by a generalized flow controller which has the capabilities to not only open and close the distribution channel but to affect the flow of electrical power in other useful and desirable ways depending on the commodity being distributed.

Distribution switch 204 is controlled by node controller 206. Node controller 206 includes a control computer 208, a display 209, and an associated memory 210. Memory 210 stores the programing to control the node and stores the database of node records about each node in the system. Each record includes a number of fields which include information that allows the node controller to control the node's switch to alter the distribution line characteristics in response to distribution system demands.

In a preferred embodiment of the invention the ordering of the node records in the database corresponds to the physical ordering of the nodes in the distribution system. It would not deviate from the present invention to have the node records in the database ordered in some other fashion and to include information in each node record of the node's actual or relative physical position in the distribution system.

Also, a preferred embodiment of the invention is for controlling a loop distribution system as in FIG. 1 in which there are two sources and a normally open switch (a "tie" switch) in the distribution line between the two sources, or a radial distribution system in which there is one source and no tie switch. It would not deviate from the present invention for the database represent more simple or more complex distribution system topologies and for the invention to be able to work on such a topology.

In a the presently preferred embodiment of the invention each node's database record includes: (1) record currently in use flag, (2) the node's communication address, (3) its normal switch state (open or closed), (4) present switch state, (5) the voltage state (is voltage present on the line or not), (6) the fault state (has a fault been detected), (7) the present time stamp (8) the database sequence number, (9) the logic process state (what state and step is the switch in), (10) error condition status flags, (11) automatic/manual operation mode status, (12) average sensed 3-phase load, (13) time stamp at start of event process. It will be appreciated that in other implementations of the invention different node data may be stored in the database record for each node without departing from the scope of the invention.

This database allows each node to have enough information about the state of the distribution system to intelligently control its local switch. Additionally, since the database is locally stored in the node, the node need not ask other nodes for information or wait to receive operating instructions from other nodes.

It will be appreciated that consistent with the present invention the record currently in use flag can be used to remove a node from coordinated system activities or allow a node to resume coordinated system activities.

Control computer 208 is connected to AC waveform processor 212. AC waveform processor 212 is connected through field interface connector 214 to distribution line 202. This allows the processor to measure various critical parameters of the electricity on the distribution line such as, voltage and current, digitally convert them, and send them to the control computer for processing, communications, or storage in memory.

Digital I/O interface 216 is connected to control computer 208, switch 204 and distribution channel 202. Digital I/O interface 216 allows computer controller 206 to receive switch position sensing information and other inputs, and to output control outputs to the switch.

Communications device 218 is connected to control computer 208 and allows it to communicate with other nodes on the system through communications channel 110 of FIG. 1. The communications devices can be connected to any communications network that is conveniently available and has the desired characteristics. In a current embodiment of the invention, a Metricom Radio is used.

A second, optional, communications device 220 can be included in the node, if desired, for use by systems other than the present invention. An example of this would be a SCADA gateway.

Power is supplied to the node through power supply/battery backup 222. The battery can be charged from solar power, an AC potential transformer, or from power supplied through the voltage sensors.

Each of the nodes is connected to a communications channel 110. Any type of communications channel can be used. In the present invention, for example, the communications channel could be telephone, radio, the Internet, or fiber optic cable.

Figure 3:
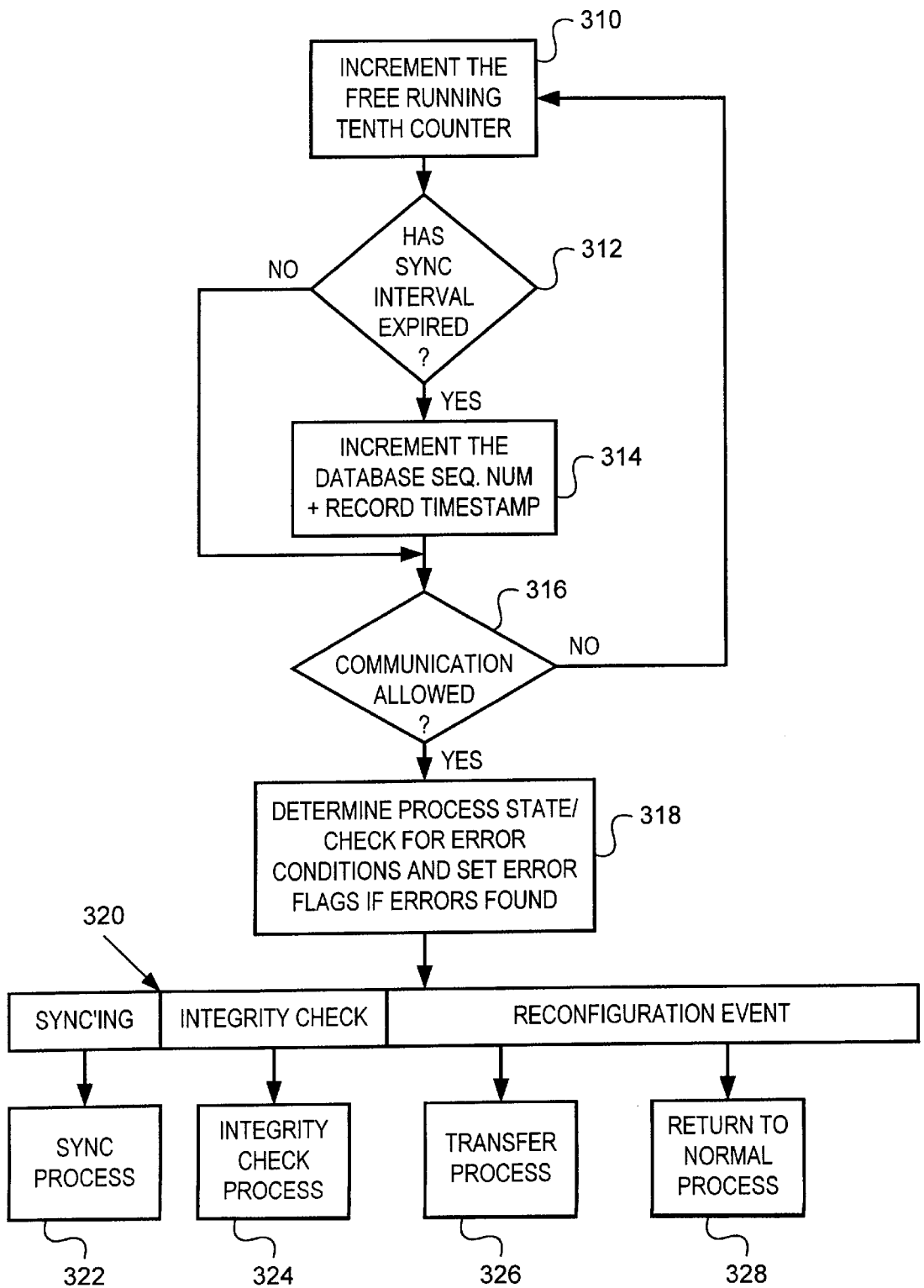
FIG. 3 is a flow chart showing the synchronization and error checking routine employed by the embodiment of FIG. 2. This routine is called by various other portions of the system flow diagram and updates the clock and counters used to synchronize the system.

FIG. 3 is a flow diagram which illustrates the operation of a synchronization counter and state selection process run by each node in accordance with the presently preferred embodiment. In this process the nodes update their timer and database sequence counter which are used to synchronize the nodes with each other. The nodes then check for error conditions and set error flags if errors are found and determine from their database which state they are in: synchronization, integrity check, or reconfiguration event.

Figure 4:
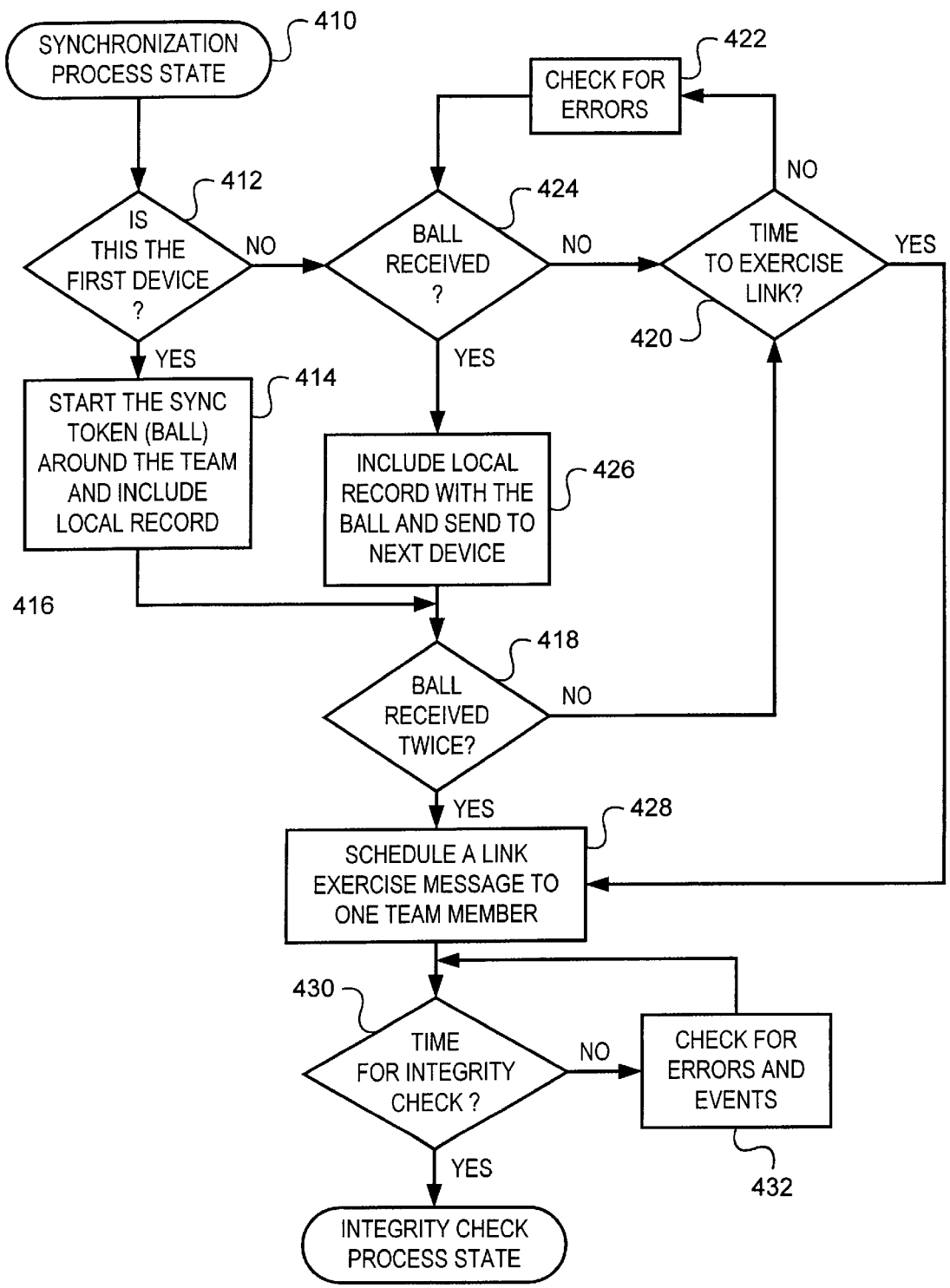
FIG. 4 is a flow chart showing the synchronization process state of employed by the embodiment of FIG. 2. This routine coordinates the transmission of the database among the nodes.

FIG. 4 is a flow diagram which illustrates the operation of the synchronization process state run by each node in accordance with the presently preferred embodiment. In this state the nodes construct a database of critical control information about the distribution system. All nodes contribute to the construction of a database. Each node stores in its memory a copy of the database. The steps in constructing the database in accordance with the presently preferred embodiment are as follows: Each node receives the database from the previous node, adds its own record of information and passes the database on to the next node. This process continues until all nodes have received a record from every other node. Once this process is compete, each node then proceeds to the integrity check state shown in FIG. 5

Figure 5:
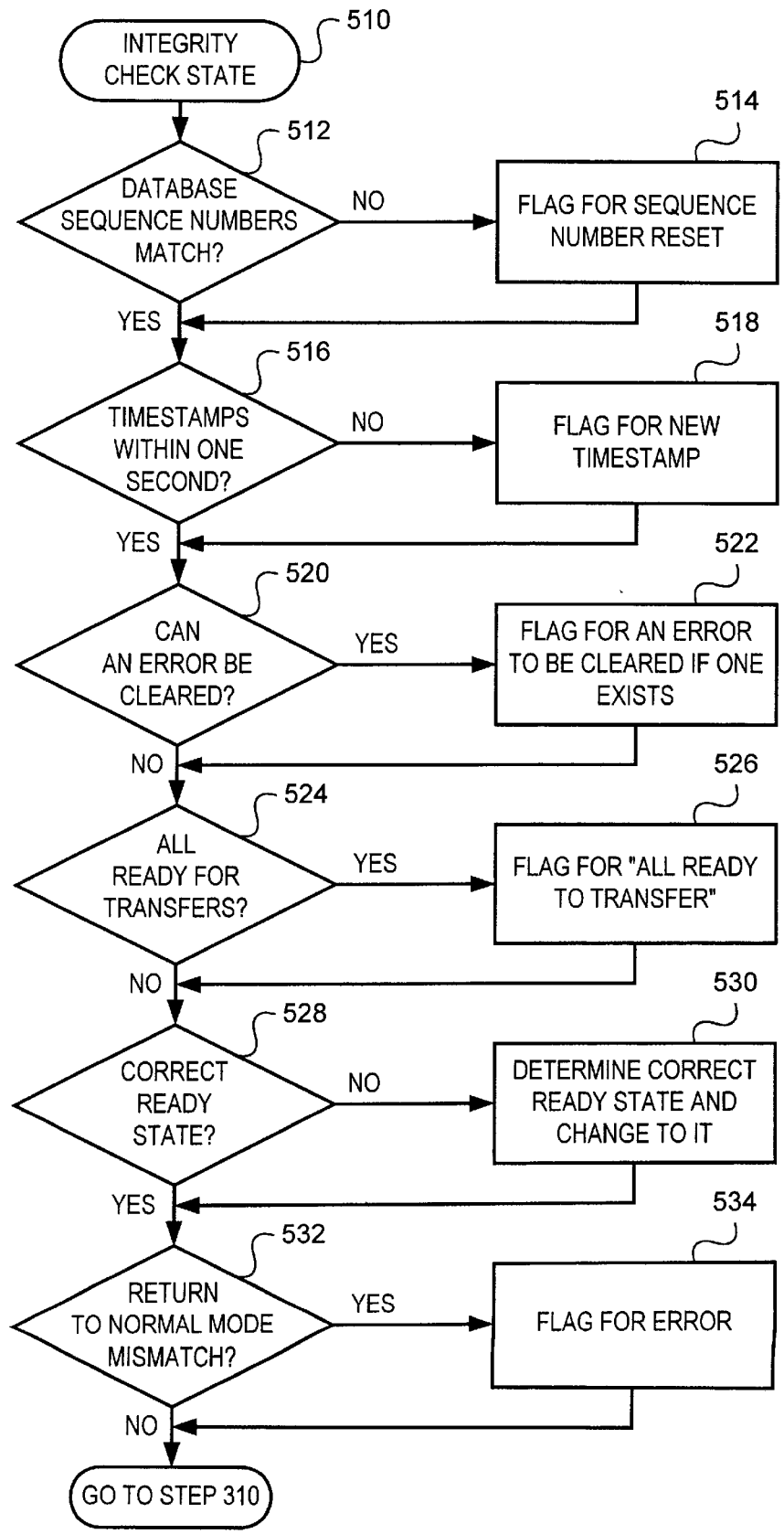
FIG. 5 is a flow chart showing the integrity check state employed by the embodiment of FIG. 2. This routine checks the database, error flags, and system state to ensure that the node is operating correctly and the data is reliable.

FIG. 5 is a flow diagram which illustrates the operation of the integrity check state process run by each node in accordance with the presently preferred embodiment. When a node runs this process, it checks the records it has received from all the other nodes to ensure that the records reflect a timely version of the state of the system.

Figure 6:
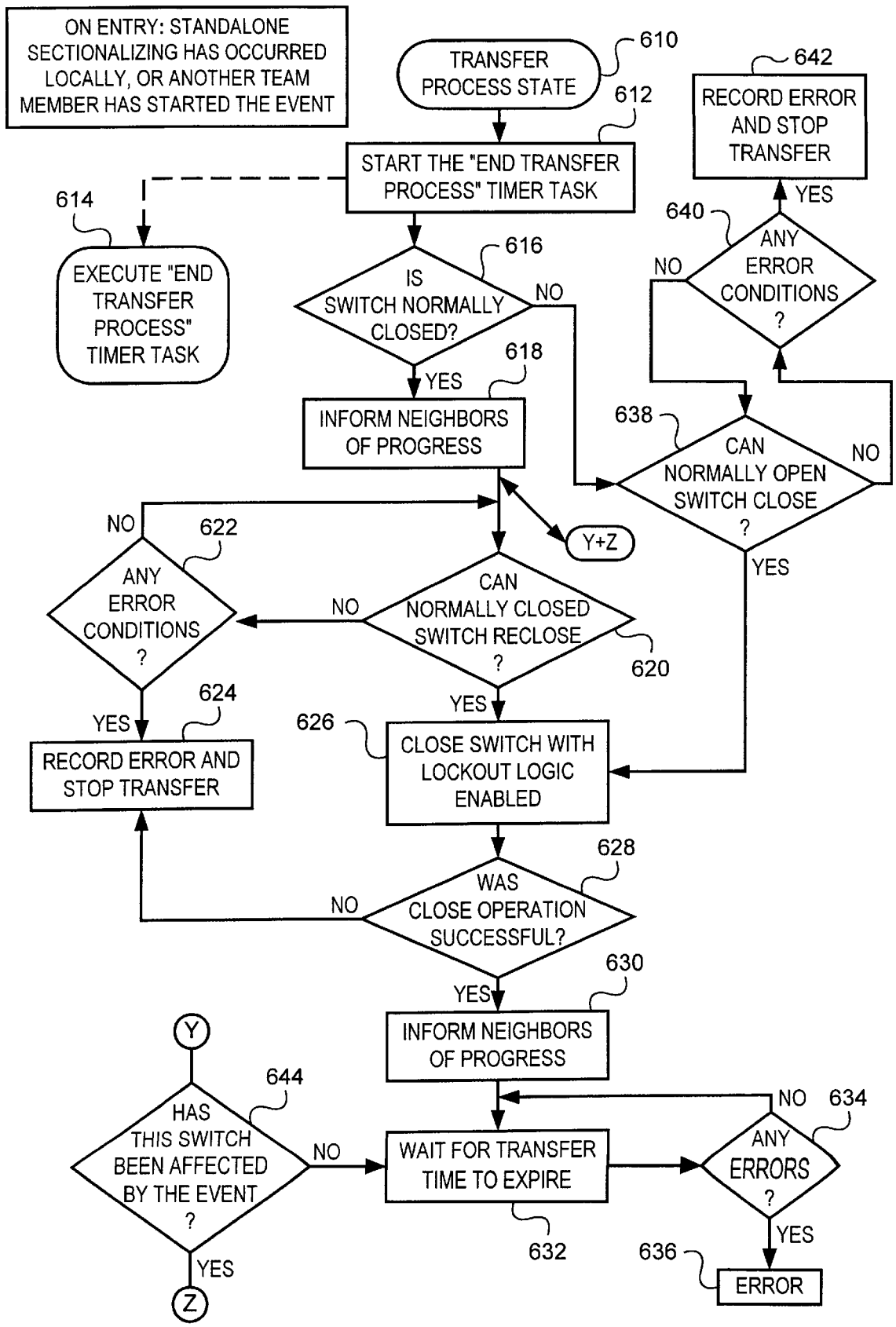
FIG. 6 is a flow chart showing the transfer process state employed by the embodiment of FIG. 2. This routine closes open switches after a fault occurs in order to restore service to as many users as possible.

FIGS. 6 is a flow diagram which illustrates the operation of the transfer process state in accordance with the presently preferred embodiment. This flow diagram describes the process used by each node upon the occupance of a fault in the system followed by standalone sectionalization. This process is also started in a node when the node receives a message that another node has entered this process. In order to restore electric power service to as many users as possible after a fault has occurred, each node will use this process to determine if it can close its associated switch.

Figure 7:
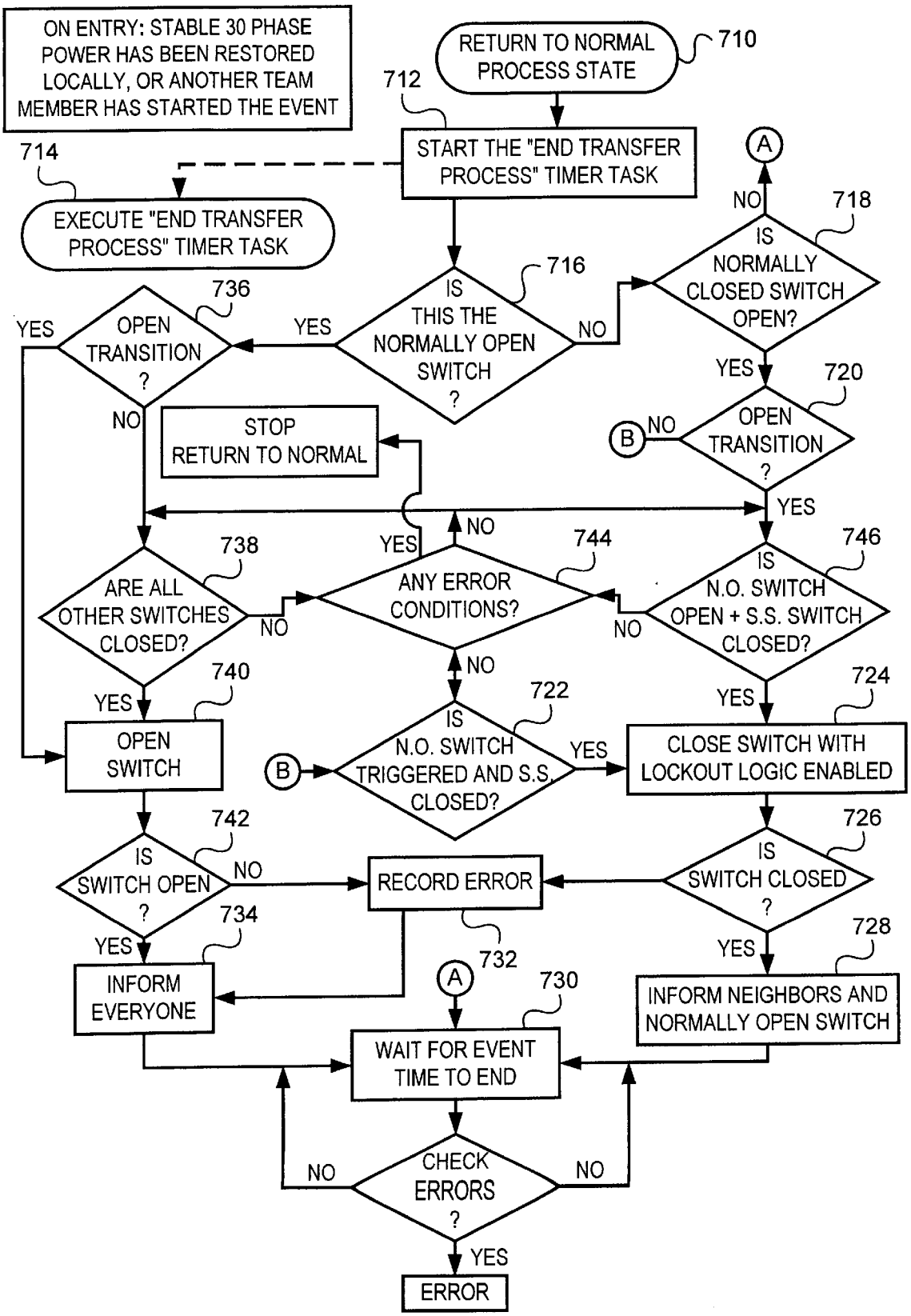
FIG. 7 is a flow chart showing the return to normal process state employed by the embodiment of FIG. 2. This routine returns the nodes to their normal state once a fault has been cleared.

FIG. 7 describes the logic used by each node to return the distribution system to its normal state once the fault has been cleared.

Figure 8:
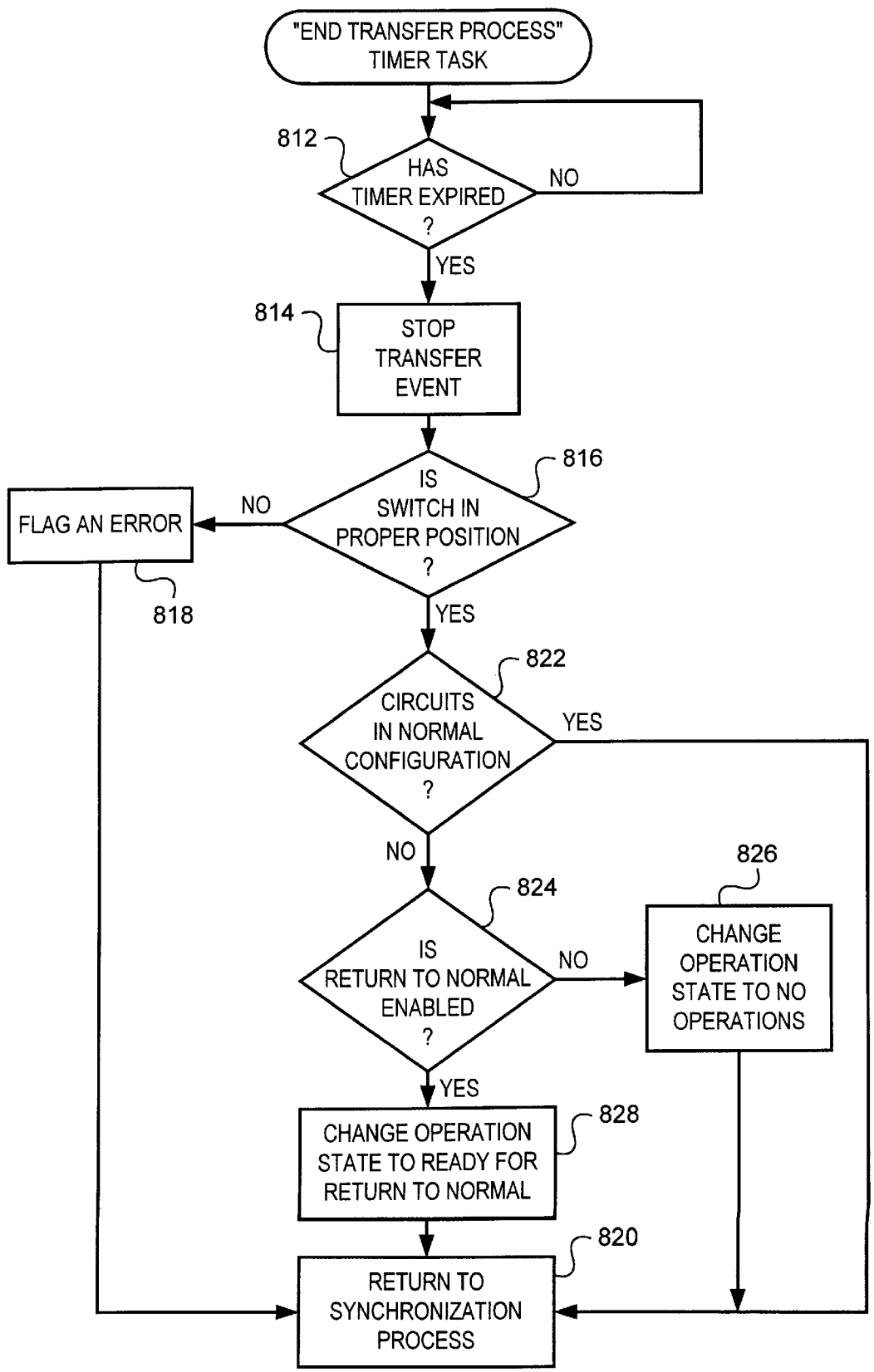
FIG. 8 is a flow chart showing the end process timer task employed by the embodiment of FIG. 2. This routine is called by either the transfer process state flow chart or the return to normal flow chart and sets a timer to ensure that the performance of these tasks does not exceed a predetermined time duration.

FIG. 8 is a flow diagram which illustrates the operation of a task timer that is used during the transfer process state of FIG. 6 and the return to normal process state of FIG. 7 in order ensure that the system does not take too much time to complete the steps required in either of these processes.

Free Running Counter

Steps 310 to 318 of FIG. 3 comprise a synchronization routine that is often called by steps in other processes run by a node, especially when a node is waiting for a specified event to occur. In step 310 the node's free running tenth counter is incremented. A free ruling counter is used to establish a reference for time stamped logic. As will be seen shortly, these counters are used to ensure synchronization among the nodes. In step 312 the node checks the free running counter to determine if it has reached its maximum. When the maximum count is reached, the synchronization interval expires. If the synchronization interval has expired then step 314 is executed and the sequence number for the database recorded by the node is incremented and a time stamp is recorded in the node's database to help ensure synchronization. The database sequence number is increase by one count on each synchronization interval and each node includes the database sequence number in its local record.

The database sequence number at each node should be the same if all of the nodes are properly functioning and synchronized. Therefore, the inclusion of each node's database sequencing number in its record allows nodes in the present invention to be certain that the data being received from other nodes is timely and reliable. In this way each node can ascertain for itself whether the system as a whole is functioning properly.

After step 314, or if the synchronization interval has not expired then the node checks to determine if communications are allowed. Communications will be prevented in certain situations. An example of when communications are not allowed in a preferred embodiment is when a team of nodes is initially being configured, all other nodes must be silent except for the node distributing the configuration information. If communication is not allowed for the node, then the node returns to step 310 and is in effect on its own for the moment.

If communication is allowed then step 320 is executed. The node will check for errors and events and set a flag if an error or event is detected. Then each node determines which of three states it is in: synchronizing, integrity check, or reconfiguration event. Each node determines on its own, independently of the other nodes, which of the three states it should be in based on its own internal sensors and the database records that it has received from the other nodes. Typically, all nodes will be in the same state unless the system is transitioning from one state to another. However, any particular node can only be in one state at a time.

Synchronization Process State

If the node is in the synchronization process state then it follows the process illustrated by the flow chart in FIG. 4. At step 412, the node must determine if it is the first active node. In a preferred embodiment of the invention the node just after either source can be configured to be the first active node in the data base and the other node would be the last active node in the data base. The nodes in between would be ordered in the database to reflect their physical ordering in the distribution system. It would not deviate from the present invention to have the nodes ordered in the database in an order other than their physical order and to include data in each node's record that allows the node's absolute or relative physical ordering to be determined.

The first node will proceed to step 414 and will start the process of constructing the database of records for the nodes. The first node will put its local record in the database and then send the database to the next node listed in the database. This database is called the "ball" as it is sent around the system from node to node. The record added to the database by each node contains the 13 items of information listed above for the currently passing node.

Although there are many possible ways that this database could be constructed and communicated, the present incarnation of the invention constructs the database by sending it to each successive node to have that node's record added onto the database. The database could be constructed in other ways without deviating from the present invention. For example, each node could simply broadcast its record on the communications channel for reception by all other nodes.

The first node will then continue on to step 418, and since the node has not yet received the ball twice, it will continue on to step 420. In step 420, the node determines if it is time to exercise its link. A node exercises its link by signaling another node to signal it back. This allows a node to determine if its communications system is working. To determine if it is time to exercise its link, a node checks the synchronization interval timer to determine if the synchronization process has taken more than a predetermined used defined period of time. This prevents the node from getting stuck in this state if there is a communications failure.

If it is not time to exercise the link, the node next goes to step 422. In this step the node executes steps 310 to 318 of FIG. 3 and checks for errors and events. If an error or event is detected, a flag is set and, if necessary, the process that is active is ended. This is called a "synchronization and error checking loop." Once this is completed, the node returns to the synchronization process and proceeds to step 424 and checks to determine if it has received the ball. When the synchronization process is run by nodes other than the first node they go from step 412 directly to step 424.

At step 424, if the node has not received the ball, it will return to step 420 and continue this cycle until it is either time to exercise the link or the ball has been received. If the ball is received then the node goes from step 424 to step 426. At step 426 the node includes its local record with the ball and sends the ball on to the next device. (The last listed node will send the ball to the first listed node.) The node proceeds to step 418 and checks whether it has receive the ball twice. If not, then the node proceeds to step 420 again and continues in that loop.

When the ball is receive the second time, the node goes from step 424 to 426 to 418 and then to step 428 and schedules a link exercise message to another node in order to test the communications link to ensure that it is working. This is the same step the node jumps to if the time to exercise the link counter in step 420 expires.

After the node has exercised its communications link in step 428, the node goes to step 430 and checks the integrity check counter to determine if it is time to enter the integrity check state as illustrated by the flow chart in FIG. 5. If it is not yet time for the node to enter the integrity check state, then the node will proceed to step 432 where it performs a synchronization and error checking loop. The node then cycles back to step 430 and will continue this loop until it is time for an integrity check.

In a preferred embodiment of the invention, the synchronization process occurs once per predetermined interval. The length of the predetermined interval is based on the number of nodes in the system. This interval could be larger or smaller without deviating from the present invention.

Thus, the synchronization process illustrated by the flow diagram in FIG. 4 periodically updates the information in each node's database. This process allows each node to contain up to date information on the status of all the other nodes.

Integrity Check State

FIG. 5 shows the flow chart which illustrates a process employed for the integrity check state. In this state each node checks to ensure that the database records contained in its memory appear to be synchronized, that there are no error conditions, and that the nodes are in the correct states. In step 512 the node checks the database sequence numbers to ensure that they all match. In this way the node can ensure that the records in the database from each node are all from the same synchronization process.

If the sequence numbers do not match, then the node goes to step 514 and a flag is set for the sequence numbers to be reset to re-synchronize them. This error flag will prevent any coordinated team activities from taking place until another synchronizing interval has taken place and the database sequence numbers match.

If the sequence numbers match, or after the flag has been set in step 514, the node then continues on to step 516. In this step the node checks each of the database records to ensure that they were all time stamped within one second of each other. This requirement ensures that the records in the database accurately reflects a picture of the system at roughly one point in time. If the records are not time stamped within one second of each other, then the node goes to step 518 and sets a flag for a new time stamp. This flag will not allow synchronized team activities if the time stamps are out of synchronization with each other by more than a predetermined amount set by the user. In one embodiment, if the time stamps are 5 seconds out of synchronization then an error flag is set. It will be appreciated that the allowable discrepancy of the time stamps is an implementation dependent parameter.

If the time stamps are not flagged as being out of synchronization, or after the flag has been set in step 518, the node then proceeds to step 520. In this step, the node checks for stop transfer errors, and if any exist, it tries to determine if the error can be cleared. Examples of errors are: (1) an out of synchronization error in which the database sequence numbers for the nodes do not match, and (2) a reconfiguration process occurred and was unable to be fully completed due to external conditions such as a malfunctioning switch.

If the error can be cleared then a flag is set in step 522 for the error to be cleared. The node then continues on to step 524. In this step the node determines if it is all ready for transfers. After a reconfiguration event, the node must make sure that all of the nodes are synchronized and that other necessary conditions are met. For example, in one embodiment, the node checks its database to determine if all of the nodes have an average 3 phase load that is within a predetermined user defined limit. If the node determines that it is all ready for transfer, then it will go to step 526 and set a flag indicating that it is all ready for transfer.

Next the node goes to step 528 to determine if it is in the correct ready state. Each node can be either ready for a transfer process or ready for a return to normal process, and all nodes should be in the same ready state. In this step, the node will compare which ready state it thinks it should be in based on its local information and the state that other nodes are in based upon information in the database. If the node is not in the correct ready state then it goes to step 530 and determines the correct ready state and changes to it.

The node then proceeds to step 532 where it checks to determine if there is a return to normal mode mismatch. In this step the node checks to make sure that all of the nodes are set to the same return to normal mode: open transition, closed transition, or function disabled. If all the nodes are not set to the same return to normal mode then there is a mismatch and at step 534 an error flag is set. Next, the node returns to step 310 in FIG. 3.

Transfer Process State

The transfer process state flow diagram of FIG. 6 will be described with the aid of a simple example. Referring to FIG. 1, assume a fault develops in distribution channel 106 between nodes 108A and 108B. Typical electrical distribution systems will have a device at the source of supply for safety and for protection of the circuit. This device is typically either a breaker or a recloser (reclosing breaker). This device will sense an over current condition (fault) and open or "trip." Reclosing devices may close again after a time delay (thus the term "recloser"), allowing transient fault conditions to clear without creating an extended service outage. If the fault has still not cleared the device may repeat the protective open operation. In either case (breaker or recloser), if the problem cannot be cleared, the device will become "locked" in an open (tripped) state (lockout).

To further isolate the faulted section of line, it is possible to place automatic devices called "sectionalizers" at switch locations 108A–F as shown in the FIG. 1. The sectionalizer is a switching device that senses current (and optionally voltage) such that the operation of the circuit and the source-side protective device can be monitored. The sectionalizer is configured to open its switch under certain circumstances when the circuit is de-energized after some number of pre-configured voltage losses have occurred within a brief time interval. The circumstances vary from product to product, but are always based upon sensing of conditions caused by faults followed shortly by voltage losses. Sectionalizers are designed to coordinate with the operation of the circuit's protective devices. Typical sectionalizers are devices such as the Cooper Power Systems Sectionalizer type GV or GW manufactured by Cooper Industries, Inc, or the EnergyLine Systems Model 2801-SC Switch Control manufactured by EnergyLine Systems. These are all well-known devices within the industry which form no part of the present invention and which need not be described in detail herein.

The "sectionalizer" described here is based on the EnergyLine Model 2801, with additional features added to support operation under a preferred embodiment of the invention. The standard sectionalizer logic will open (trip) the switch if: 1) its sectionalizing logic is enabled and the device is operational, 2) a pre-configured number of voltage losses (typically 1–3) on all sensed phases have been counted within a brief time period (typically 45 seconds), 3) an overcurrent condition was sensed just prior to the first voltage loss, and 4) the switch is presently closed. An additional option in the conventional software allows the switch to trip if voltage, sensed on all three phases, becomes grossly unbalanced, and remains unbalanced continuously for a configured time period (typically 30 seconds).

An optional feature that can be provided in a preferred embodiment of the invention causes the switch to open on a configured count of voltage losses even if a fault was not sensed just prior to the loss of voltage. This allows the first step of isolating both sides of the faulted section of line to be executed immediately without communication to other devices. Another optional feature causes the configured count on voltage losses (subsequent to sensed faults) to be dynamically calculated locally based upon the position of the switch relative to the presently designated open tie switch. Configuration parameters allow this dynamically calculated range of counts to be further constrained by the user to always fall between a minimum and maximum number. Another option allows the switch to open after a single extended voltage loss. Finally, the counting of faults followed by voltage losses can be configured to count each event as a fault either: 1) if the first voltage loss was preceded by a fault, or 2) if all voltage losses were preceded by faults.

Another unique feature of a preferred embodiment of the invention is its modified one-shot-to-lockout capability. If a switch is closed as part of any automatic operation (or manually closed by a human operator), some sectionalizers, including the EnergyLine Model 2801-SC, can be configured to automatically re-open the switch if a voltage loss is detected during a brief interval following the operation (typically 5 seconds). A preferred embodiment of the invention has the additional capability to avoid opening the switch until two counts of voltage loss have been detected. This becomes a benefit when the circuit's breaker reclose pattern includes an initial instantaneous close operation following a trip operation due to a fault.

Referring to FIG. 1, if power distribution system 100 contains a sectionalizer, then after the fault occurred between nodes 108A and 108B on distribution channel 106, a typical sectionalizer, depending on how it is configured, would cause switches in any one or all of nodes 108A, 108B and 108C to open causing all users 104A, 104B, and 104C that are down stream from an open switch to lose service.

In one implementation of the invention, the sectionalizing logic will be set up to open all switches between the fault and the normally open tie switch 108G. This allows the present embodiment of the invention to reclose switches one at a time to gradually increase the load seen by the distribution system to aid the system in resuming service to users. Once any node has finished sectionalization the node enters the transfer process state illustrated in flow diagram of FIG. 6 in which a node will attempt to close its switch. Also a node will enter the transfer process when it receives a communication that another node or team of nodes has entered the transfer process.

Without departing from the present invention, the transfer process state could be initiated by an event other than finishing sectionalization. Depending on the type of distribution system and its needs and characteristics, it may be desirable to have other events trigger the system into action. For example, it may be desirable to have the system triggered into action by detection of a serious under or over voltage condition.

Each node is continually updating the record in its database concerning its own status information. Thus, while the records in the database concerning all other nodes, the ball, is sent to each node only in the synchronization process state, each node maintains an updated record on its own status.

For the purposes of this example, assume that sectionalization has caused the switches in nodes 108A, 108B, and 108C to open resulting in users 104A, 104B, and 104C all losing service. Once sectionalization has ended, each of the three nodes 108A, 108B, and 108C will independently begin the transfer process state because they each have undergone standalone sectionalization.

When a node enters the transfer process state depicted in the flow chart of FIG. 6, the node executes step 612 and starts the end process timer task. This timer ensures that the nodes do not spend too long trying to complete the task. Should something prevent the node from completing the task in the allotted time, the timer will end the transfer process state. Each node will use the same start time for its timer as the node that first initiated the transfer process. In this way all nodes in the transfer process will "time out" at the same time. The operation of this timer and the task it calls are shown in FIG. 8 and will be discussed below.

The length of the timer can be set by the system operator to meet the needs of the particular system being controlled. For example, to ensure the safety of repairmen working on the power lines after a fault has occurred, the timer could be set to remove the nodes from the transfer process a known period of time after the fault occurred. In this way, even if the conditions in the transfer process state are met which would have allowed a switch to close and energize a power line, repairmen who have begun to service the system are not put in danger because the transfer process has timed out and the switch will not close.

In a preferred embodiment of the present invention, each of these three nodes enters the transfer process on its own, triggered by its own logic, stored data and sensor readings. The presently preferred embodiment of the invention does not require central control, communication, or approval for any of the nodes to enter this state.

Once the timer has been started, the node proceeds to step 616 and determines if the switch it is controlling is closed during the normal operation of the distribution network.

Referring to FIG. 1, switches 108A, 108B, 108C, 1081D, 108E, and 108F are closed during normal operation of distribution system, and switch 108G, a tie switch, is open during the normal operation of the system. Since switches 108A, 108B, and 108C are each normally closed during the operation of the system, these nodes will continue on to step 618. At step 618 each of the nodes that has entered the transfer process state will transmit its updated record to the next active node listed in the database and the previous active node listed in the database. These two nodes are called the "nearest neighbor" nodes. Node 108A will transmit to node 108B, node 108B will transmit to nodes 108A and 108C, and node 108C will transmit to nodes 108B and 108G. In this way each switch that has entered the transfer process state will inform its nearest neighbors of its progress. It will be appreciated that, although the presently preferred embodiment employs communication between "nearest" neighbors, alternative embodiments may employ different node-to-node communication patterns consistent with the invention. Thus, in accordance with a presently preferred embodiment of the invention, each node can inform other nodes of its state regardless of the physical layout of the distribution system or the physical deployment of the nodes.

When node 108G receives the communication from node 108C, node 108G will start the transfer process state. In general, when one node receives a communication from another node that the other node has entered the transfer process state, the node receiving the communication will itself enter the transfer process state. This procedure allows the system to self organize, eventually putting each node of the system into the transfer process state without requiring any communication from a central office or any interaction with a human.

Furthermore, in the presently preferred embodiment, there need not be any centralized control or logic center to decide what actions are appropriate for each node to undertake at a given point in the process. Each node of the present invention can operate based only on its sensors and the information in the database. Due to this simple operating structure, the present invention can be easily expanded or reconfigured by simply reordering the nodes in the database without the need to change the programing or logic of the present invention. For example, to add a new node between nodes 108B and 108C of FIG. 1, the system operator would physically insert the new node into the system at the appropriate place and program it into the database between nodes 108B and 108C. This is accomplished by moving the records for all of the nodes in the database after node 108B down one space and inserting the record for the new node in this newly created space in the data base.

Node 108G executes step 612, starts the end transfer process timer, sets it to end at the same time as the node(s) that initiated the transfer process, and then goes to step 616. Since node 108G controls a switch that is normally open it will go to step 638. At step 638 node 108G will observe its sensors, the information in its database, and the information sent to it by node 108C to determine whether it can close. In a presently preferred embodiment of the invention, the conditions listed in Table 1 are checked by the node in order to determine if it can close. The conditions used at step 4 in Table 1 are shown in Table 2. Other sets of conditions could be used without departing from the invention.

TABLE 1

In order to close the normally open switch associated with a node, one valid closed switch and one valid open switch must be detected as the adjacent switches associated with adjacent nodes on either side of the normally open switch. The following rules define the conditions that must be met for the normally open switch to validate the state of adjacent switches.
A normally open switch on the load side of a faulted line section may close for the purpose of restoring load if:
1. no error conditions exist
2. the adjacent fault side switch is open
3. the adjacent fault side switch did not detect a fault, but did see a loss of voltage
4. the current level seen by the adjacent fault side switch before the outage is within the bounds set in the local switch (The conditions used in this step are shown in Table 2.)
5. the adjacent non-faulted side switch indicates it observed a voltage loss and/or fault but it is now closed, or the adjacent non-faulted side switch is the normally open switch, or the adjacent non-faulted side switch is a breaker and voltage has been restored (this step is bypassed if the local switch is the normally open switch)
6. the adjacent switches are in the proper logical operation step

TABLE 2

(This Table elaborates on step 4 in tables 1 and 3)
In order to determine whether load may be restored during a transfer process, the process uses the total load to be transferred compared to the capacity of the alternate circuit. Three basic set points are used by an engineer to limit transferred load. They are:
Capacity for Transfer (total feeder load n/a)
Maximum Capacity for Transfer
Maximum Rated Feeder Capacity
All three set points have settings for the left feeder and the right. All three also have summer and non-summer season settings.
The transfer process utilizes, if available, the real time total load on the associated feeders. This real time total load value may come over communications from any source such as a substation RTU.
The two set points that work with this process are the "Maximum Capacity for Transfer" and the "Maximum Rated Feeder Capacity". The "Maximum Capacity for Transfer" is the configured amount of load that may be transferred to alternate feeder when that feeder is lightly loaded. The "Maximum Rated Feeder Capacity" is used in combination with the actual real time load. The difference between these two is the present real time capacity the alternate feeder can handle. In order for a transfer to occur, the load that was reported to exist before the reconfiguration event began by the next open switch must be less than both the present real time capacity and the "Maximum Capacity for Transfer".
The real time load must be sent to the switch controls at least once every 20 minutes.
After 20 minutes past the last reception of real time load the value goes to undefined. An undefined value causes the fall back process to take affect. This prevents old load data from allowing transfers to occur when the source of this data fails to report it.
The fall back process uses the "Capacity for Transfer (total feeder load n/a)." This value is intended to be a conservative value. When configuring this value the engineer should take into account average loading, peak loading, and the emergency load capacity on the alternate feeder. The engineer should feel comfortable that a transfer of this amount of load can occur at any time and still be accommodated by the alternate feeder.

Note that the process for the two feeders is independent. Real time loading data may be provided for one feeder while the other feeder uses the conservative transfer process.

Assume that all of the conditions are met to allow the switch at node 108G to be able to close. Through the use of the conditions listed in Tables 1 and 2, the node can determine on its own whether or not it can close its associated switch. Additionally, only one message had to be sent to enable node 108G to act to restore service—the message from 108C.

If the conditions were not met to allow the switch to be able to close, then node 108G would go to step 640 and execute the synchronization and error check routine. If an error is detected during this time then at step 642 it is recorded and the transfer is stopped. Otherwise, the node will continue to cycle between steps 638 and 640 until the switch can be closed, an error is detected, or the end transfer process timer expires.

Once node 108G determines that it can close its associated switch it will proceed to step 626 and attempt to close it. Typically such switches will have safety devices called lockout logic, as detailed above during the discussion of sectionalization, that will force the switch back open and keep it open if an anomaly such as a voltage loss is detected when the switch is closed. At step 628 the switch determines if the closing operation was successful. If it was not then at step 624 an error flag is set and the transfer process is stopped. If the close operation was successful, then power is restored to users 104C and node 108G continues to step 630.

At step 630 node 108G sends its updated record to its nearest neighbors, nodes 108C and 108D. Node 108D now enters the transfer process state, and as nodes 108A, 108B, and 108C did, node 108D will proceed down the flow chart to step 618 and send its updated record to nodes 108G and 108E. This will cause node 108E to enter the transfer process state and signal nodes 108D and 108F causing 108F to enter the transfer process state and signal node 108E with its updated recorded.

As can be seen from the present example, one feature of the invention is that from only the ordering of the nodes in the database and the rules of the flow charts, each node can determine the appropriate actions to take independently of actions taken by other nodes. Nodes do not command other nodes to take any given action, nor is central control or human intervention necessary to coordinate the response of the entire system. The decisions made by each node are based solely on information it has stored in its database and sensors attached to it.

Nodes 108A, 108B, 108C, 108D, 108E, and 108F all will proceed to step 644. Since the switches at nodes 108D, 108E, 108F are normally closed switches and they were not affected by the fault, they will be sent to step 632 at step 644 and will wait for the process to time out while they perform the synchronization and error checking loop with steps 634 and 636.

Since the switches at nodes 108A, 108B, and 108C were affected by the event, they each proceed to step 620. In a presently preferred embodiment of the invention the conditions listed in Table 3 are checked by the node in order to determine if it can reclose. The conditions used at step 4 in Table 3 are shown in Table 2. Other sets of conditions could be used without departing from the invention.

If these switches cannot be reclosed then the nodes will go to step 622 and perform synchronization and error checking. If an error is detected then in step 624 a flag will be set, and the transfer process state will be stopped. If no errors are detected then each node will cycle through steps 620 and 622 until the switch can be reclosed or the process timer expires.

timer to time out. If an error is detected, step 636 is executed and a flag is set and the transfer process is stopped. An example of an error is if the lockout logic causes a switch to reopen.

As the above discussion and rules indicate, one benefit of a preferred embodiment of the present invention is its ability to operate by systematically closing only one switch at a time so that the load to the system is brought on line gradually, one segment at a time. This helps ensure that the power source will not be overloaded due to too rapid an increase in demand.

When node 108B receives the communication from node 108C, assume that node 108B will have enough information to know that according to the conditions listed in Table 3, it should not close since node 108A detected a fault and node 108B did not. This must mean that the fault was between nodes 108A and 108B. Therefore, node 108B will cycle between states 620 and 622 until an error is detected or the end transfer process timer expires. Node 108A, since it has detected a fault, will also not be allowed to close and will cycle though steps 620 and 622 until an error is detected or the process timer times out.

When the end transfer process task timer times out, the nodes will all return to step 310 of FIG. 3 and resume synchronization, error and integrity checks until the original fault is repaired. If the fault is repaired, the system will enter the return to normal process state of FIG. 7 discussed below. If another fault occurs before the previous one has been corrected, it would not deviate from the present invention for

TABLE 3

In order to reclose the normally closed switch associated with a node, one valid closed switch and one valid open switch must be detected as the adjacent switches associated with adjacent nodes on either side of the normally closed switch. The following rules define the conditions that must be met for the normally closed switch to validate the state of adjacent switches.
A presently open switch on the load side of a faulted line section may close for the purpose of restoring load if:
1. no error conditions exist
2. the adjacent fault side switch is open
3. the adjacent fault side switch did not detect a fault, but did see a loss of voltage
4. the current level seen by the adjacent fault side switch before the outage is within the bounds set in the local switch (The conditions used in this step are shown in Table 2.)
5. the adjacent non-faulted side switch indicates it observed a voltage loss and/or fault but it is now closed, or the adjacent non-faulted side switch is the normally open switch, or the adjacent non-faulted side switch is a breaker and voltage has been restored (this step is bypassed if the local switch is the normally open switch)
6. the adjacent switches are in the proper logical operation step A normally closed switch on the source side of a faulted line section may reclose if:
a. no error conditions exist
b. the adjacent fault side switch is open
c. the adjacent fault side switch detected a fault
d. the adjacent non-faulted side switch indicates it saw a voltage loss and/or fault but it is now closed, or the non-faulted side is the breaker and voltage has been restored
e. the adjacent switches are in the proper logical operation step Through the use of algorithm of Tables 2 and 3, a node can determine on its own whether or not it can close its associated switch. Assume that all of the conditions are met to allow the switch at node 108C to be able to reclose its switch. The switch will then be reclosed at step 626.

At step 628 node 108C will determine if the switch was successfully reclosed. If it was not, then an error flag is set and the transfer process is stopped in step 624. If the switch was successfully reclosed then the node proceeds to step 630 and informs its nearest neighbors, nodes 108B and 108G, of its progress by sending them an updated version of its record. Node 108C then enters the loop between steps 632 and 634 where it performs the synchronization and error checking routine while it waits for the end transfer process the system to re-enter the transfer process state and again reclose switches to return service to as many users as possible.

Return to Normal Process State

After a fault has occurred or if for any other reason the distribution network switches have been put in states other than their normal operating states, for example after the transfer process has completed, the return to normal process state can return the system to its normal operating configuration. This process can also be used to reconfigure the distribution system to any desired system set up of open and closed switches without deviating from the present invention. In the example used above, once the fault in distribution channel 106 has been repaired or cleared and switch 108A has been manually reclosed, power will be restored to users 104A. At this point, node 108B will sense that normal voltage has been restored to the distribution channel between nodes 108A and 108B and it will be triggered to enter the return to normal process state after node 108B has detected stable 3 phase voltage on the channel for a predetermined time. Once any switch in the system has entered the return to normal state, it will signal all other switches to enter the return to normal state.

At step 712 the node starts the end transfer process task timer. Each node will use the same start time for its end transfer process timer. This timer ensures that the system does not spend too much time attempting to execute the return to normal process. The timer is set to run for a predetermined time set by the system operator. In one embodiment, this timer is set to run for one minute. The node next executes step 716. Since nodes 108A–F are normally closed switches, each of these nodes continues on to step 718.

Switches 108D–F are normally closed switches that were not open so they will each go to step 730 and perform a synchronization and error checking loop while they wait for the process to end. Switches 108A and 108C are normally closed switches that were reclosed by the transfer process so each of these nodes will also go to step 730 and perform a synchronization and error checking loop while they wait for the process to end. Node 108B is a normally closed switch that is open so it moves on to step 720 to determine if it is an open transition.

An open transition is one in which the source of supply of power to users is interrupted in the process of switching between alternate sources of supply. For instance, in this example, if tie switch 108G was opened up before switch 108B was closed then users 104B and 104C would lose power momentarily. This would be an open transition. In a closed transition, switch 108B is closed before switch 108G is opened and users 104B and 104C do not lose power. The system operator can configure the system to operate in either an open or closed transition mode.

Assume the system operator set the system to undergo a closed transition. Then node 108B go from step 720 to step 722. If the normally open switch, 108G, is armed to reopen and the switch on the supply side of switch 108B, switch 108A, is closed then node 108B will continue to on to step 724 and close its switch. The normally open switch is armed to reopen when all of the user defined conditions have been met such that the switch is ready to open.

If the normally open switch is not armed or the supply side switch is not closed, then node 108B will perform a synchronization and error checking loop and return to step 722. This loop will continue until either both conditions are met or the end transfer process timer expires.

If the switch is closed at step 724, then at step 726 the node checks to see if the switch is closed. The switch could have been reopened by lockout logic or any other safety feature on the switch that might force it back open. If the switch is closed then at step 728 the node will inform its nearest neighbors and the normally open switch, 108G, by sending them an updated version of its record. The node then goes to step 730 where it performs the synchronization and error checking loop while waiting for the end transfer process timer to time out. If the switch is not closed at step 726, then at step 732 an error flag is set and at step 734 the node informs all other nodes that an error has occurred and the node then goes on to step 730.

If the system is set to undergo an open transition, then at step 720, the node will go to step 746. If the normally open switch is open and the supply side switch, switch 108A, is closed then the node will continue on to step 724. If either of these conditions is not met, then the node will perform a synchronization and error checking loop between steps 744 and 746.

Switch 108G is a normally open switch so at step 716 it will proceed to step 736. If the system is undergoing a closed transition, the nodes goes to step 738 if all the other switches are closed, node. 108G will open the normally open switch at step 740. The node will then check if the switch is actually open at step 742. If the switch is open it will send its updated record to all the nodes at step 734 and then enter the loop at step 730 and wait for the process timer to end. If the switch is not open at step 742 then an error flag will be recorded at step 732 and the node will proceed to step 734.

At step 738 if all the other switches were not closed then the node will loop to step 744 and perform synchronization and error checking and look back to step 738. This loop continues until all the switches are closed, an error is recorded or the timer expires.

If the system were programed to undergo an open transition, then at step 736 node 108G would not look to see if other switches were closed and it would skip to step 740, open the switch and continue the flow chart from that step.

End Process Timer Task

Whenever a node enters either the transfer process or the return to normal process, the node starts the end process timer task. The flow diagram for this task is show in FIG. 8. At step 812 the node loops until the timer expires. The timer is initiated when the node enters the task and from the information sent to the node by other nodes, each node will know the time at which the first node to enter the task in question began the task. In this way all of the nodes can set their end process timers to expire at the same time. It would not deviate from the invention to have the end process task timer be of different durations for the transfer process and the return to normal process.

Once the timer expires, the node will stop the process it is in and look to see if the switch is in the proper position for the end of the process that was stopped. For example, is the switch in its normal position at the end of the return to normal state. If the switch is not in the correct position, then step 818 is executed and an error flag is set and the node returns to the synchronization process at step 820.

If the node's switch is in the correct position then at step 816 the node goes to step 822 and checks to see if the circuit is in the normal configuration. If it is then the node goes to step 820. If it is not in the normal configuration, then the node goes to step 824 and checks if the return to normal is enabled. If the system does not have the return to normal enabled it will go to step 826 and change its operation state to no operation and wait for further instructions before it can re-enter the ready to transfer state. From step 826, the system will go to 820.

If the return to normal is enabled then at step 828 the node changes its operation state to ready for return to normal and then proceeds on to step 820.

What is claimed is:

1. A system for automated reconfiguration of a distribution system, comprising:
   a plurality of switches, switches in the plurality of switches being located in the distribution system;
   a plurality of switch controllers;

switch controllers in the plurality of switch controllers controlling respective switches in the plurality of switches and including resources which monitor the distribution system, which open their respective switches in response to detection of a condition requiring reconfiguration, which communicate information with at least one other switch controller in the plurality of switch controllers to transmit and receive communicated information including both:

a condition of the distribution system, and a condition of switches in the plurality of switches;

which process the communicated information in order to determine whether to close their respective switches; and which close their respective switches if switch controllers in the plurality of switch controllers determine that they should close their respective switches.

2. The system for automated reconfiguration of the distribution system of claim 1, wherein:

the distribution system comprises an electrical power distribution system.

3. The system for automated reconfiguration of the distribution system of claim 1, wherein:

the communicated information includes communicated information added by each switch controller in the plurality of switch controllers communicating the communicated information.

4. The system for automated reconfiguration of the distribution system of claim 2, wherein:

the condition requiring reconfiguration is at least one of an over current condition, a loss of voltage condition, and a phase imbalance condition.

5. The system for automated reconfiguration of the distribution system of claim 1, wherein the information communicated between switch controllers comprises:

the condition of switches in the plurality of switches prior to detection of the condition requiring reconfiguration.

6. The system for automated reconfiguration of the distribution system of claim 1, wherein switch controllers in the plurality of switch controllers comprise:

a resource which can determine if the condition of switches in the plurality of switches after detection of the condition requiring reconfiguration is different from the condition of switches in the plurality of switches prior to detection of the condition requiring reconfiguration.

7. The system for automated reconfiguration of the distribution system of claim 1, wherein switch controllers in the plurality of switch controllers include:

a resource to detect a resolution of the condition requiring reconfiguration.

8. The system for automated reconfiguration of the distribution system of claim 7, wherein the information communicated between switch controllers includes:

a preferred configuration of the condition of switches in the plurality of switches for after the resolution of the condition requiring reconfiguration.

9. The system for automated reconfiguration of the distribution system of claim 8, wherein switch controllers in the plurality of switch controllers include:

a resource which puts switches in the plurality of switches in the preferred configuration of the condition of switches in the plurality of switches for after the resolution of the condition requiring reconfiguration.

10. The system for automated reconfiguration of the distribution system of claim 1, wherein switch controllers in the plurality of switch controllers include:

a resource which can do at least one of disengage and engage switch controllers in the plurality of switch controllers from acting as part of the system for automated reconfiguration of the distribution system.

11. The system for automated reconfiguration of the distribution system of claim 10, wherein:

the resource which can do at least one of disengage and engage switch controllers in the plurality of switch controllers from acting as part of the system for automated reconfiguration of the distribution system allows a switch controller in the plurality of switch controllers to do at least one of disengage and engage itself from acting as part of the system for automated reconfiguration of the distribution system.

12. The system for automated reconfiguration of the distribution system of claim 10, wherein the information communicated between switch controllers includes:

information concerning switch controllers in the plurality of switch controllers which have done at least one of engage and disengage from acting as part of the system for auto mated reconfiguration of the distribution system.

13. The system for automated reconfiguration of the distribution system of claim 10, wherein the information communicated between switch controllers includes:

information concerning switch controllers in the plurality of switch controllers which have not done at least one of engage and disengage from acting as part of the system for automated reconfiguration of the distribution system.

14. The system for automated reconfiguration of the distribution system of claim 1, wherein:

the resource which opens the switch in the plurality of switches controlled by the switch controller in the plurality of switch controllers opens the switch in the plurality of switches when the switch controller in the plurality of switch controllers detects a predetermine number of operations of a distribution system protective device.

15. The system for automated reconfiguration of the distribution system of claim 14, wherein:

the distribution system protective device includes at least one of a recloser, and a circuit breaker.

16. The system for automated reconfiguration of the distribution system of claim 1, wherein the information communicated between switch controllers in the plurality of switch controllers includes:

a time stamp indicating a time at which the information is transmitted from the switch controllers in the plurality of switch controllers.

17. The system for automated reconfiguration of the distribution system of claim 1, wherein the information communicated between switch controllers in the plurality of switch controllers includes:

information identifying an ordering of information that has been communicated by the switch controller in the plurality of switch controllers.

18. The system for automated reconfiguration of the distribution system of claim 17, wherein the information identifying the ordering of information that has been communicated by the switch controller in the plurality of switch controllers includes:

information identifying a sequence number in which information is communicated by the switch controller in the plurality of switch controllers.

19. The system for automated reconfiguration of the distribution system of claim 1, wherein the information concerning the condition of the distribution system includes:

a rate of flow of at least one of matter and energy in the distribution system prior to detection of the condition requiring reconfiguration.

20. The system for automated reconfiguration of the distribution system of claim 19, wherein the rate of flow of at least one of matter and energy includes:
a rate of flow of electric current.

21. The system for automated reconfiguration of the distribution system of claim 1, wherein the information concerning the condition of the distribution system includes:
a rate of the flow of at least one of matter and energy in the distribution system at switch controllers in the plurality of switch controllers.

22. The system for automated reconfiguration of the distribution system of claim 21, wherein the rate of flow of at least one of matter and energy includes:
a rate of flow of electric current.

23. The system for automated reconfiguration of the distribution system of claim 1, wherein switch controllers in the plurality of switch controllers determine whether to close their respective switches based on factors including:
a seasonal load variation.

24. The system for automated reconfiguration of the distribution system of claim 1, wherein switch controllers in the plurality of switch controllers determine whether to close their respective switches based on factors including:
a time related load variation.

25. The system for automated reconfiguration of the distribution system of claim 24, wherein the time related load variations include:
a load variation related to a time of day.

26. The system for automated reconfiguration of the distribution system of claim 24, wherein the time related load variation includes:
a load variation related to a day of the week.

27. The system for automated reconfiguration of the distribution system of claim 1, wherein switch controllers in the plurality of switch controllers close their respective switches in response to factors including:
a safety factor.

28. The system for automated reconfiguration of the distribution system of claim 1, wherein:
the processing of the communicated information results in switch controllers in the plurality of switch controllers closing their respective switches one at a time.

29. The system for automated reconfiguration of the distribution system of claim 28, wherein switch controllers determines whether to close their respective switches based on information including:
if the switch is connected through the distribution system to a closed switch.

30. The system for automated reconfiguration of the distribution system of claim 14, wherein:
the processing of the communicated information results in switch controllers in the plurality of switch controllers closing their respective switches one at a time.

31. The system for automated reconfiguration of the distribution system of claim 1, wherein:
a first switch controller in the plurality of switch controllers transmits the communicated information to a second switch controller in the plurality of switch controllers.

32. The system for automated reconfiguration of the distribution system of claim 31, wherein:
the second switch controller in the plurality of switch controllers receives the communicated information from the first switch controller in the plurality of switch controllers and transmits the communicated information to the first switch controller in the plurality of switch controllers.

33. The system for automated reconfiguration of the distribution system of claim 31, wherein:
the second switch controller in the plurality of switch controllers receives the communicated information from the first switch controller in the plurality of switch controllers and transmits the communicated information to a next switch controller in the plurality of switch controllers.

34. The system for automated reconfiguration of the distribution system of claim 33, wherein:
the next switch controller is a last switch controller in the plurality of switch controllers, and the last switch controller in the plurality of switch controllers receives the communicated information from the second switch controller in the plurality of switch controllers and transmits the communicated information to the first switch controller in the plurality of switch controllers.

35. The system for automated reconfiguration of the distribution system of claim 33, wherein:
a last switch controller in the plurality of switch controllers receives communicated information from a next to last switch controller in the plurality of switch controllers and transmits the communicated information to the first switch controller in the plurality of switch controllers.

36. The system for automated reconfiguration of the distribution system of claim 1, including:
an ordering of switch controllers in the plurality of switch controllers; and switch controllers in the plurality of switch controllers communicate with switch controllers in the plurality of switch controllers which are adjacent in the ordering of switch controllers in the plurality of switch controllers.

37. The system for automated reconfiguration of the distribution system of claim 1, wherein:
switch controllers in the plurality of switch controllers have an ordering, switch controllers in the plurality of switch controllers communicate information of a first type to switch controllers in the plurality of switch controllers which are adjacent in the ordering, and switch controllers in the plurality of switch controllers communicate information of a second type to a set of switch controllers in the plurality of switch controllers.

38. The system for automated reconfiguration of the distribution system of claim 1, wherein:
a resource prevents switch controllers in the plurality of switch controllers from closing their respective switches after a predetermined time has elapsed since detection of the condition requiring reconfiguration.

39. The system for automated reconfiguration of the distribution system of claim 1, wherein:
a resource prevents switch controllers in the plurality of switch controllers from closing their respective switches after a predetermined time has elapsed since the opening of the switch.

40. The system for automated reconfiguration of the distribution system of claim 1, wherein:
switch controllers in the plurality of switch controllers include a resource which can detect a second condition requiring reconfiguration occurring after said condition requiring reconfiguration and occurring before the system for automated reconfiguration of the distribution system has put switches in the plurality of switches in a preferred configuration of switches in the plurality of switches.

41. The system for automated reconfiguration of the distribution system of claim 40, wherein:

switch controllers in the plurality of switch controllers open their respective switches in response to detection of the second condition requiring reconfiguration.

42. The system for automated reconfiguration of the distribution system of claim 1, wherein switch controllers in the plurality of switch controllers include:

a resource that reopens the respective switch if after closing the respective switch the condition of the distribution system is outside a predetermined range of the condition of the distribution system.

43. The system for automated reconfiguration of the distribution system of claim 42, wherein the condition of the distribution system includes:

a voltage of the distribution system.

44. The system for automated reconfiguration of the distribution system of claim 42, wherein the condition of the distribution system includes:

an electric current of the distribution system.

45. The system for automated reconfiguration of the distribution system of claim 42, wherein the resource that reopens the respective switch includes:

a resource which prevents the respective switch from being closed by the system for automated reconfiguration of the distribution system after a predetermined time period has elapsed.

46. The system for automated reconfiguration of the distribution system of claim 1, wherein:

switch controllers in the plurality switch controllers include a port for communicating using radio waves.

47. The system for automated reconfiguration of the distribution system of claim 1, wherein:

switch controllers in the plurality switch controllers include a port for communicating using fiber optics cables.

48. The system for automated reconfiguration of the distribution system of claim 1, wherein:

switch controllers in the plurality switch controllers include a port for communicating using telephone lines.

49. The system for automated reconfiguration of the distribution system of claim 1, wherein:

switch controllers in the plurality switch controllers include a port for communicating using microwaves.

50. A switch controller controlling a switch in a distribution system as part of a system for automated reconfiguration of a distribution system, the switch controller comprising:

a plurality of resources which monitor a condition of the distribution system at the switch, which open the switch in response to detection of a condition requiring reconfiguration, which communicate information with at least one other switch controller in a plurality of switch controllers to transmit and receive communicated information including both:
 a condition of the distribution system, and a condition of switches in a plurality of switches;
which process the communicated information in order to determine whether the switch controller can close the switch; and
which closes the switch if the switch controller determines that it should close the switch.

51. The system for automated reconfiguration of the distribution system of claim 50, wherein:

the distribution system comprises an electrical power distribution system.

52. The system for automated reconfiguration of the distribution system of claim 50, wherein:

the communicated information includes communicated information added by each switch controller in the plurality of switch controllers communicating the communicated information.

53. The system for automated reconfiguration of the distribution system of claim 51, wherein:

the condition requiring reconfiguration is at least one of an over current condition, a loss of voltage condition, and a phase imbalance condition.

54. The system for automated reconfiguration of a distribution system of claim 50, wherein the resource which monitors the distribution system includes:

a sensor which monitors a voltage on a side of the switch.

55. The system for automated reconfiguration of the distribution system of claim 50, wherein the resource which monitors the distribution system includes:

a sensor which monitors an electric current on a side of the switch.

56. The system for automated reconfiguration of the distribution system of claim 50, wherein the resource which monitors the distribution system includes:

a sensor which monitors a power on a side of the switch.

57. The system for automated reconfiguration of the distribution system of claim 50, wherein:

the switch controller includes a memory device.

58. The system for automated reconfiguration of the distribution system of claim 57, wherein:

the communicated information is stored in the memory device.

59. The system for automated reconfiguration of the distribution system of claim 58, wherein:

the communicated information is stored in a data structure in the memory device.

60. The system for automated reconfiguration of the distribution system of claim 59, wherein:

the data structure stores the information communicated from the switch controllers in the plurality of switch controllers in respective records in a plurality of records in the data structure.

61. The system for automated reconfiguration of the distribution system of claim 60, wherein the information communicated by the switch controller includes:

the condition of the switch prior to detection of the condition requiring reconfiguration.

62. The system for automated reconfiguration of the distribution system of claim 61, wherein the switch controller includes:

a resource which can determine, based on the information stored in the respective records in the data structure, if the condition of switches in the plurality of switches is different from the condition of switches in the plurality of switches prior to detection of the condition requiring reconfiguration.

63. The system for automated reconfiguration of the distribution system of claim 50, wherein the switch controller includes:

a resource to detect a resolution of the condition requiring reconfiguration.

64. The system for automated reconfiguration of the distribution system of claim 61, wherein the information communicated between switch controllers includes:

a preferred configuration of the condition of switches in the plurality of switches for after the resolution of the condition requiring reconfiguration.

65. The system for automated reconfiguration of the distribution system of claim 59, wherein the data structure includes:

a preferred configuration of the condition of switches in the plurality of switch for after a resolution of the condition requiring reconfiguration.

66. The system for automated reconfiguration of the distribution system of claim 50, wherein the switch controller includes:

a resource which puts the switch into a preferred configuration.

67. The system for automated reconfiguration of the distribution system of claim 50, wherein the switch controller includes:

a resource which can do at least one of engage and disengage the switch controller from acting as part of the system for automated reconfiguration of the distribution system.

68. The system for automated reconfiguration of the distribution system of claim 67 wherein:

the switch controller sets a flag in its respective record to indicate if it has done at least one of engage and disengage from acting as part of the system for automated reconfiguration of the distribution system.

69. The system for automated reconfiguration of the distribution system of claim 67, wherein the information communicated by the switch controller further comprises:

information concerning switch controllers in the plurality of switch controllers which have done at least one of engage and disengaged from acting as part of the system for automated reconfiguration of the distribution system.

70. The system for automated reconfiguration of the distribution system of claim 67, wherein:

in a database in a memory in the switch controller a flag is set in the record in a plurality of records for switch controllers in the plurality of switch controllers which have done at least one of engage and disengaged from acting as part of the system for automated reconfiguration of the distribution system.

71. The system for automated reconfiguration of the distribution system of claim 50, wherein:

the resource which opens the switch opens the switch when the switch controller detects a predetermine number of operation of a distribution system protective device.

72. The system for automated reconfiguration of the distribution system of claim 71, wherein:

the distribution system protective device includes a circuit breaker.

73. The system for automated reconfiguration of the distribution system of claim 50, wherein the information communicated by the switch controller includes:

a time stamp indicating a time at which the information is communicated from the switch controller.

74. The system for automated reconfiguration of the distribution system of claim 60, wherein the information stored in the record in the plurality of records in the database includes:

a time stamp indicating a time at which the information communicated from the at least one of the switch controllers in the plurality of switch controllers.

75. The system for automated reconfiguration of the distribution system of claim 50, wherein the information communicated by the switch controller further comprises:

information identifying an ordering of the information that has been communicated the switch controller.

76. The system for automated reconfiguration of the distribution system of claim 74 wherein:

the record in the database in the switch controller contains a field which contains information identifying an ordering of information that has been communicated from the at least one other switch controller in the plurality of switch controllers.

77. The system for automated reconfiguration of the distribution system of claim 74, wherein the information identifying the ordering of information that has been communicated by the switch controller further comprises:

information identifying a sequence number in which information is communicated by the switch controller.

78. The system for automated reconfiguration of the distribution system of claim 76, wherein:

the record in the database in the switch controller contains a field which contains the information identifying the sequence number in which information is communicated by switch controllers in the plurality of switch controllers.

79. The system for automated reconfiguration of the distribution system of claim 50, wherein the information concerning the condition of the distribution system includes:

a rate of flow of at least one of matter and energy in the distribution system at the switch prior to the detection of the condition requiring reconfiguration.

80. The system for automated reconfiguration of the distribution system of claim 79, wherein the rate of flow of at least one of matter and energy includes:

a rate of flow of electric current.

81. The system for automated reconfiguration of the distribution system of claim 50 wherein the switch controller closes it respective switch in response to factors including:

a seasonal load variation.

82. The system for automated reconfiguration of the distribution system of claim 50, wherein the switch controller closes it respective switch in response to factors including:

a time related load variation.

83. The system for automated reconfiguration of the distribution system of claim 82, wherein the time related load variation includes:

a load variation related to a time of day.

84. The system for automated reconfiguration of the distribution system of claim 82, wherein the time related load variation includes:

a load variation related to a day of the week.

85. The system for automated reconfiguration of the distribution system of claim 50, wherein the switch controller closes its respective switch in response to factors including:

a safety factor.

86. The system for automated reconfiguration of the distribution system of claim 50, wherein the switch controller determines if the switch can be closed based on information including:

if the switch is connected to a closed switch through the distribution system.

87. The system for automated reconfiguration of the distribution system of claim 50, wherein:

a first switch controller in the plurality of switch controllers transmits the communicated information to a second switch controller in the plurality of switch controllers.

88. The system for automated reconfiguration of the distribution system of claim 87, wherein:
the second switch controller in the plurality of switch controllers receives the communicated information from the first switch controller in the plurality of switch controllers and transmits the communicated information to the first switch controller in the plurality of switch controllers.

89. The system for automated reconfiguration of the distribution system of claim 87, wherein:
the second switch controller in the plurality of switch controllers receives the communicated information from the first switch controller in the plurality of switch controllers and transmits the communicated information to a next switch controller in the plurality of switch controllers.

90. The system for automated reconfiguration of the distribution system of claim 88, wherein:
the next switch controller is a last switch controller in the plurality of switch controllers, and the last switch controller in the plurality of switch controllers receives the communicated information from the second switch controller in the plurality of switch controllers and transmits the communicated information to the first switch controller in the plurality of switch controllers.

91. The system for automated reconfiguration of the distribution system of claim 88, wherein:
a last switch controller in the plurality of switch controllers receives communicated information from a next to last switch controller in the plurality of switch controllers and transmits the communicated information to the first switch controller in the plurality of switch controllers.

92. The system for automated reconfiguration of the distribution system of claim 50, including:
an ordering of switch controllers in the plurality of switch controllers; and the switch controller communicates with switch controllers in the plurality of switch controllers which are adjacent to the switch controller ordering of switch controllers in the plurality of switch controllers.

93. The system for automated reconfiguration of the distribution system of claim 50, wherein:
switch controllers in the plurality of switch controllers have an ordering, the switch controller communicates information of a first type to switch controllers in the plurality of switch controllers which are adjacent to the switch controller in the ordering, and the switch controller communicates information of a second type to a set of switch controllers in the plurality of switch controllers.

94. The system for automated reconfiguration of the distribution system of claim 50, wherein:
the switch controller includes a resource which prevents the switch from closing after a predetermined time has elapsed since detection of the condition requiring reconfiguration.

95. The system for automated reconfiguration of the distribution system of claim 50, wherein:
the switch controller includes a resource which prevents the switch from closing after a predetermined time has elapsed since the switch was opened.

96. The system for automated reconfiguration of the distribution system of claim 50, wherein:
the switch controller includes a resource which can detect a second condition requiring reconfiguration occurring after said condition requiring reconfiguration and occurring before the system for automated reconfiguration of the distribution system has put switches in the plurality of switches in a preferred configuration of switches in the plurality of switches.

97. The system for automated reconfiguration of the distribution system of claim 96, wherein:
the switch controller opens the switch in response to detection of the second condition requiring reconfiguration.

98. The system for automated reconfiguration of the distribution system of claim 50, wherein the switch controller includes:
a resource that reopens the switch if after closing the switch the condition of the distribution system is not within a predetermined range of the condition of the distribution system.

99. The system for automated reconfiguration of the distribution system of claim 98, wherein the condition of the distribution system includes:
a voltage of the distribution system.

100. The system for automated reconfiguration of the distribution system of claim 98, wherein the condition of the distribution system includes:
an electric current of the distribution system.

101. The system for automated reconfiguration of the distribution system of claim 98, wherein the resource that will reopen the switch further comprises:
a resource which prevents the switch from being closed by the switch controller.

102. The system for automated reconfiguration of the distribution system of claim 50, wherein:
the switch controller includes a port for communicating using radio waves.

103. The system for automated reconfiguration of the distribution system of claim 50, wherein:
the switch controller includes a port for communicating using fiber optics cables.

104. The system for automated reconfiguration of the distribution system of claim 50, wherein:
the switch controller includes a port for communicating using telephone lines.

105. The system for automated reconfiguration of the distribution system of claim 50, wherein:
the switch controller includes a port for communicating using microwaves.

106. In a distribution system including a plurality of switches located in the distribution system, a plurality of switch controllers, switch controllers in the plurality of switch controllers controlling respective switches in the plurality of switches, a method for automated reconfiguration of the distribution system, comprising the steps of:
monitoring a condition of the distribution system;
opening switches in response detection of a condition requiring reconfiguration;
communicating information from at least one switch controller in the plurality of switch controllers to at least one other switch controller in the plurality of switch controllers, the communicated information including both:
the monitored condition, and a condition of switches in the plurality of switches;

processing the communicated information at the switch controller in order to determine whether to close the respective switch controlled by the switch controller; and closing the switch if the switch controller determines that the switch should be closed.

107. The system for automated reconfiguration of the distribution system of claim 106, wherein:

the distribution system comprises an electrical power distribution system.

108. The system for automated reconfiguration of the distribution system of claim 106, wherein:

the communicated information includes communicated information added by each switch controller in the plurality of switch controllers communicating the communicated information.

109. The system for automated reconfiguration of the distribution system of claim 107, wherein:

the condition requiring reconfiguration is at least one of an over current condition, a loss of voltage condition, and a phase imbalance condition.

110. The method of claim 106, including the step of:

storing the communicated information in a memory device at the switch controller.

111. The method of claim 106, including the step of determining if the condition of the respective switch is different from the condition of the respective switch prior to detection of the condition requiring reconfiguration.

112. The method of claim 106, including the step of:

putting the switch in a preferred configuration of the condition of the switch.

113. The method of claim 106, including the step of:

the switch controller doing at least one of engaging and disengaging itself from acting as part of the system for automated reconfiguration of the distribution system.

114. The method of claim 106, wherein the step of opening the switch includes:

opening the switch when the switch controller detects a predetermined number of operations of a distribution system protective devices.

115. The method of claim 114, wherein:

the distribution system protective device includes a circuit breaker.

116. The method of claim 106, including the step of:

time stamping the communicated information.

117. The method of claim 106, including the step of:

sequence stamping the communicated information.

118. The method of claim 106, wherein the switch controller determines whether to close the respective switch controlled by the switch controller based on information including:

a time related load variation.

119. The method of claim 106, wherein the switch controller determines whether to close the respective switch controlled by the switch controller based on information including:

a safety factor.

120. The method of claim 106, wherein the switch controller determines whether to close the respective switch controlled by the switch controller based on information including:

if the switch is connected to a closed switch through the distribution system.

121. The method of claim 106, wherein:

the switch controller communicates with switch controllers in the plurality of switch controllers that are adjacent to the switch controller in an ordering of switch controllers in the plurality of switch controllers.

122. The method of claim 106, including the step of:

preventing the switch from closing after a predetermined time has elapsed since detection of the condition requiring reconfiguration.

123. The method of claim 106, including the step of:

preventing the switch from closing after a predetermined time has elapsed since the switch was opened.

124. The method of claim 106, including the step of:

detecting a second condition requiring reconfiguration occurring before the system for automated reconfiguration of the distribution system has put switches in the plurality of switches in a preferred configuration of switches in the plurality of switches.

125. The method of claim 124, including the step of:

opening the switch in response to detection of the second condition requiring reconfiguration.

126. The method of claim 106, including the step of:

reopening the switch if after closing the switch the condition of the distribution system is not within a predetermined range of the condition of the distribution system before the condition requiring reconfiguration.

127. The method of claim 106, wherein the step of communicating information includes:

communicating using radio waves.

128. The method of claim 106, wherein the step of communicating information includes:

communicating using microwaves.

129. The method of claim 106, wherein the step of communicating information includes:

communicating using a fiber optic cable.

130. The method of claim 106, wherein the step of communicating information includes:

communicating using telephone lines.

131. A system for automated reconfiguration of a distribution system distributing a commodity, comprising:

a plurality of switches, switches in the plurality of switches being located in the distribution system;

a plurality of switch controllers;

switch controllers in the plurality of switch controllers controlling respective switches in the plurality of switches and including resources which monitor the distribution system, which configure their respective switches to prevent flow of the commodity through the switches in response to detection of a condition requiring reconfiguration, which communicate information with at least one other switch controller in the plurality of switch controllers to transmit and receive communicated information including both:

a condition of the distribution system, and a condition of switches in the plurality of switches;

which process the communicated information in order to determine whether to configure their respective switches to allow flow of the commodity through the switches; and which configure their respective switches to allow flow of the commodity through the switches if switch controllers in the plurality of switch controllers determine that they should configure their respective switches to allow flow of the commodity through the switches.

132. A switch controller controlling a switch in a distribution system as part of a system for automated reconfiguration of the distribution system, the switch controller comprising:

a plurality of resources which monitor a condition of the distribution system at the switch, which configure the switch to prevent flow of a commodity through the switch in response to detection of a condition requiring reconfiguration, which communicate information with at least one other switch controller in a plurality of switch controllers to transmit and receive communicated information including both:

a condition of the distribution system, and a condition of switches in a plurality of switches;

which process the communicated information in order to determine whether the switch controller can configure the switch to allow flow of the commodity through the switch; and which configure the switch to allow flow of the commodity through the switch if the switch controller determines that it should configure the switch to allow flow of the commodity through the switch.

133. In a distribution system distributing a commodity, the distribution system including a plurality of switches located in the distribution system, a plurality of switch controllers, switch controllers in the plurality of switch controllers controlling respective switches in the plurality of switches, a method for automated reconfiguration of the distribution system, comprising the steps of:

monitoring a condition of the distribution system;

configuring switches to prevent flow of the commodity through the switches in response detection of a condition requiring reconfiguration;

communicating information from at least one switch controller in the plurality of switch controllers to at least one other switch controller in the plurality of switch controllers, the communicated information including both:

the monitored condition, and a condition of switches in the plurality of switches;

processing the communicated information at the switch controller in order to determine whether to configure the respective switch controlled by the switch controller to allow flow of the commodity through the switch; and configuring the switch to allow flow of the commodity through the switch if the switch controller determines that the switch should be configured to allow flow of the commodity though the switch.

134. A system for automated reconfiguration of a distribution system, comprising:

a plurality of switches, switches in the plurality of switches being located in the distribution system;

a plurality of switch controllers;

switch controllers in the plurality of switch controllers controlling respective switches in the plurality of switches and including resources which monitor the distribution system, which open their respective switches in response to detection of a condition requiring reconfiguration, which communicate information with at least one other switch controller in the plurality of switch controllers to transmit and receive communicated information including:

a condition of the distribution system, a condition of switch controllers in the plurality of switch controllers, and a condition of switches in the plurality of switches;

which process the communicated information in order to determine whether to close their respective switches; and which close their respective switches if switch controllers in the plurality of switch controllers determine that they should close their respective switches, wherein switch controllers in the plurality of switch controllers determine whether to close their respective switches based on factors including a seasonal load variation.

135. A system for automated reconfiguration of a distribution system, comprising:

a plurality of switches, switches in the plurality of switches being located in the distribution system;

a plurality of switch controllers;

switch controllers in the plurality of switch controllers controlling respective switches in the plurality of switches and including resources which monitor the distribution system, which open their respective switches in response to detection of a condition requiring reconfiguration, which communicate information with at least one other switch controller in the plurality of switch controllers to transmit and receive communicated information including:

a condition of the distribution system, a condition of switch controllers in the plurality of switch controllers, and a condition of switches in the plurality of switches;

which process the communicated information in order to determine whether to close their respective switches; and which close their respective switches if switch controllers in the plurality of switch controllers determine that they should close their respective switches, wherein switch controllers in the plurality of switch controllers determine whether to close their respective switches based on factors including a time related load variation.

136. The system for automated reconfiguration of the distribution system of claim 135, wherein the time related load variations include a load variation related to a time of day.

137. The system for automated reconfiguration of the distribution system of claim 135, wherein the time related load variation includes a load variation related to a day of the week.

138. A system for automated reconfiguration of a distribution system, comprising:

a plurality of switches, switches in the plurality of switches being located in the distribution system;

a plurality of switch controllers;

switch controllers in the plurality of switch controllers controlling respective switches in the plurality of switches and including resources which monitor the distribution system, which open their respective switches in response to detection of a condition requiring reconfiguration, which communicate information with at least one other switch controller in the plurality of switch controllers to transmit and receive communicated information including:

a condition of the distribution system, a condition of switch controllers in the plurality of switch controllers, and a condition of switches in the plurality of switches;

which process the communicated information in order to determine whether to close their respective switches; and which close their respective switches if switch controllers in the plurality of switch controllers determine that they should close their respective switches, wherein a first switch controller in the plurality of switch controllers transmits the communicated information to a second switch controller in the plurality of switch controllers; and wherein:

the second switch controller in the plurality of switch controllers receives the communicated information from the first switch controller in the plurality of switch controllers and transmits the communicated information to a next switch controller in the plurality of switch controllers.

139. The system for automated reconfiguration of the distribution system of claim 138, wherein the next switch controller is a last switch controller in the plurality of switch controllers, and the last switch controller in the plurality of switch controllers receives the communicated information from the second switch controller in the plurality of switch controllers and transmits the communicated information to the first switch controller in the plurality of switch controllers.

140. The system for automated reconfiguration of the distribution system of claim 138, wherein a last switch controller in the plurality of switch controllers receives communicated information from a next to last switch controller in the plurality of switch controllers and transmits the communicated information to the first switch controller in the plurality of switch controllers.

141. A switch controller controlling a switch in a distribution system as part of a system for automated reconfiguration of a distribution system, the switch controller comprising:
a plurality of resources which monitor a condition of the distribution system at the switch, which open the switch in response to detection of a condition requiring reconfiguration, which communicate information with at least one other switch controller in a plurality of switch controllers to transmit and receive communicated information including:
a condition of the distribution system, a condition of switch controllers in the plurality of switch controllers, and a condition of switches in a plurality of switches;
which process the communicated information in order to determine whether the switch controller can close the switch; and
which closes the switch if the switch controller determines that it should close the switch, wherein the switch controller closes it respective switch in response to factors including a seasonal load variation.

142. A switch controller controlling a switch in a distribution system as part of a system for automated reconfiguration of a distribution system, the switch controller comprising:
a plurality of resources which monitor a condition of the distribution system at the switch, which open the switch in response to detection of a condition requiring reconfiguration, which communicate information with at least one other switch controller in a plurality of switch controllers to transmit and receive communicated information including:
a condition of the distribution system, a condition of switch controllers in the plurality of switch controllers, and a condition of switches in a plurality of switches;
which process the communicated information in order to determine whether the switch controller can close the switch; and
which closes the switch if the switch controller determines that it should close the switch, wherein the switch controller closes it respective switch in response to factors including a time related load variation.

143. The system for automated reconfiguration of the distribution system of claim 142, wherein the time related load variation includes a load variation related to a time of day.

144. The system for automated reconfiguration of the distribution system of claim 142, wherein the time related load variation includes a load variation related to a day of the week.

145. A switch controller controlling a switch in a distribution system as part of a system for automated reconfiguration of a distribution system, the switch controller comprising:
a plurality of resources which monitor a condition of the distribution system at the switch, which open the switch in response to detection of a condition requiring reconfiguration, which communicate information with at least one other switch controller in a plurality of switch controllers to transmit and receive communicated information including:
a condition of the distribution system, a condition of switch controllers in the plurality of switch controllers, and a condition of switches in a plurality of switches;
which process the communicated information in order to determine whether the switch controller can close the switch; and
which closes the switch if the switch controller determines that it should close the switch, wherein a first switch controller in the plurality of switch controllers transmits the communicated information to a second switch controller in the plurality of switch controllers, and wherein the second switch controller in the plurality of switch controllers receives the communicated information from the first switch controller in the plurality of switch controllers and transmits the communicated information to a next switch controller in the plurality of switch controllers.

146. A switch controller controlling a switch in a distribution system as part of a system for automated reconfiguration of a distribution system, the switch controller comprising:
a plurality of resources which monitor a condition of the distribution system at the switch, which open the switch in response to detection of a condition requiring reconfiguration, which communicate information with at least one other switch controller in a plurality of switch controllers to transmit and receive communicated information including:
a condition of the distribution system, a condition of switch controllers in the plurality of switch controllers, and a condition of switches in a plurality of switches; which process the communicated information in order to determine whether the switch controller can close the switch; and
which closes the switch if the switch controller determines that it should close the switch, wherein a first switch controller in the plurality of switch controllers transmits the communicated information to a second switch controller in the plurality of switch controllers, and wherein the second switch controller in the plurality of switch controllers receives the communicated information from the first switch controller in the plurality of switch controllers and transmits the communicated information to the first switch controller in the plurality of switch controllers, and wherein the next switch controller is a last switch controller in the plurality of switch controllers, and the last switch controller in the plurality of switch controllers receives the communicated information from the second switch controller in the plurality of switch controllers and transmits the communicated information to the first switch controller in the plurality of switch controllers.

147. A switch controller controlling a switch in a distribution system as part of a system for automated reconfiguration of a distribution system, the switch controller comprising:

a plurality of resources which monitor a condition of the distribution system at the switch, which open the switch in response to detection of a condition requiring reconfiguration, which communicate information with at least one other switch controller in a plurality of switch controllers to transmit and receive communicated information including:
a condition of the distribution system, a condition of switch controllers in the plurality of switch controllers, and a condition of switches in a plurality of switches;

which process the communicated information in order to determine whether the switch controller can close the switch; and which closes the switch if the switch controller determines that it should close the switch, wherein a first switch controller in the plurality of switch controllers transmits the communicated information to a second switch controller in the plurality of switch controllers, and wherein the second switch controller in the plurality of switch controllers receives the communicated information from the first switch controller in the plurality of switch controllers and transmits the communicated information to the first switch controller in the plurality of switch controllers, and wherein a last switch controller in the plurality of switch controllers receives communicated information from a next to last switch controller in the plurality of switch controllers and transmits the communicated information to the first switch controller in the plurality of switch controllers.

148. In a distribution system including a plurality of switches located in the distribution system, a plurality of switch controllers, switch controllers in the plurality of switch controllers controlling respective switches in the plurality of switches, a method for automated reconfiguration of the distribution system, comprising the steps of:

monitoring a condition of the distribution system;

opening switches in response detection of a condition requiring reconfiguration;

communicating information from at least one switch controller in the plurality of switch controllers to at least one other switch controller in the plurality of switch controllers, the communicated information including:
the monitored condition, and a condition of switches in the plurality of switches; processing the communicated information at the switch controller in order to determine whether to close the respective switch controlled by the switch controller; and closing the switch if the switch controller determines that the switch should be closed, wherein the switch controller determines whether to close the respective switch controlled by the switch controller based on information including a time related load variation.

\* \* \* \* \*